United States Patent [19]
Hsieh

[11] Patent Number: 6,026,308
[45] Date of Patent: Feb. 15, 2000

[54] COMBINATION CORDLESS PHONE-FAX MODEM-COMPUTER

[76] Inventor: Mingchih Hsieh, 19971 Merritt Dr., Cupertino, Calif. 95014

[21] Appl. No.: 08/840,333

[22] Filed: Apr. 28, 1997

[51] Int. Cl.[7] ...................................................... H04B 1/38
[52] U.S. Cl. ............................ 455/557; 455/78; 455/575; 455/550
[58] Field of Search ..................... 455/422, 557, 455/575, 77, 78, 66, 434, 550; 375/222

[56] References Cited

U.S. PATENT DOCUMENTS

| | | | |
|---|---|---|---|
| 4,147,904 | 4/1979 | Carpenter et al. | 455/77 |
| 4,677,653 | 6/1987 | Weiner et al. | 455/434 |
| 4,731,814 | 3/1988 | Becker et al. | 379/61 |
| 4,991,197 | 2/1991 | Morris | 455/557 |
| 5,465,401 | 11/1995 | Thompson | 455/557 |
| 5,491,839 | 2/1996 | Schotz | 455/66 |
| 5,553,138 | 9/1996 | Heald et al. | 379/413 |

*Primary Examiner*—Nguyen Vo
*Assistant Examiner*—Greta J. Fuller
*Attorney, Agent, or Firm*—Robert Samuel Smith

[57] ABSTRACT

A combination phone and modem interfacing a computer with switching means using a common transmitter/receiver for communicating wirelessly with a base transmitter/receiver. Controls on the keypad of the phone permit the user to conveniently select by depressing the appropriate key for transmitting or receiving voice messages for the phone or digital data for the computer. In one configuration, the phone, transmitter and receiver are in an enclosure separate from the computer and modem. In another configuration, the phone, transmitter, receiver and modem are in an enclosure separate from the computer.

13 Claims, 32 Drawing Sheets

IF PNP OPTION IS NOT SUPPORTED, USE FOLLOWING TABLE:
COMPORT SELECTION:
```
            COM1   J3-J4,J7-J6,J12-J9.   3F8-3FF   IRQ4
            COM2   J3-J5,J7-J6,J10-J9.   2F8-2FF   IRQ3
            COM3   J3-J4,J7-J8,J12-J9.   3E8-3EF   IRQ4
            COM4   J3-J5,J7-J8,J10-J9.   2E8-2EF   IRQ3
```
IRQ SELECTION:
```
            IRQ3   J10-J9.      IRQ10   J13-J28.
            IRQ4   J12-J9.      IRQ11   J29-J31.
            IRQ5   J11-J14.     IRQ12   J27-J31.
            IRQ7   J30-J14.     IRQ15   J26-J31.
            IRQ9   J15-J28.
```

(UPPER LEFT SECTION OF DRAWING)

(MIDDLE LEFT SECTION OF DRAWING)

(LOWER LEFT SECTION OF DRAWING)

(UPPER RIGHT SECTION OF DRAWING)

NOTE: The values of R6,R7,R19,R242
are functions of the XFMR type
and the value of R209 & R210.

| When R209/210 are zero Ohms. | | | | | | When R209/210 are 18.2 Ohms. | | | | |
|---|---|---|---|---|---|---|---|---|---|---|
| V.xx | XFMR | R6 | R7 | R242 | R19 | V.xx | XFMR | R6 | R7 | R242 | R19 |
| V.32 | 1538 | 536 | 6.19K | OPEN | 10.0K | V.32 | 1538 | 499 | 5.11K | OPEN | 10.0K |
| V.32 | 8025 | 432 | 191 | 1.5K | OPEN | V.32 | 8025 | 442 | 226 | 1.5K | OPEN |
| V.34 | 8262 | 422 | 698 | 3.01K | OPEN | V.34 | 8262 | 442 | 165 | 1.33K | OPEN |

(MIDDLE RIGHT
SECTION OF DRAWING)

(LOWER RIGHT SECTION OF DRAWING)

(UPPER MIDDLE SECTION OF DRAWING)

(MIDDLE MIDDLE SECTION OF DRAWING)

(LOWER MIDDLE SECTION OF DRAWING)

(FIRST SECTION OF DRAWING)

(SECOND SECTION OF DRAWING)

(THIRD SECTION OF DRAWING)

FOR V.32 U15 IS 5494R31-003 70nS EPROM
FOR V.34 U15 IS 5494R32-001 45nS EPROM

FOR MUSIC ON HOLD BRING EXT CABLE J22/J21

FOR TELEPHONE EMULATION CONN J22 TO J23

(FOURTH SECTION OF DRAWING)

(FIFTH SECTION OF DRAWING)

(SIXTH SECTION
OF DRAWING)

(SEVENTH SECTION OF DRAWING)

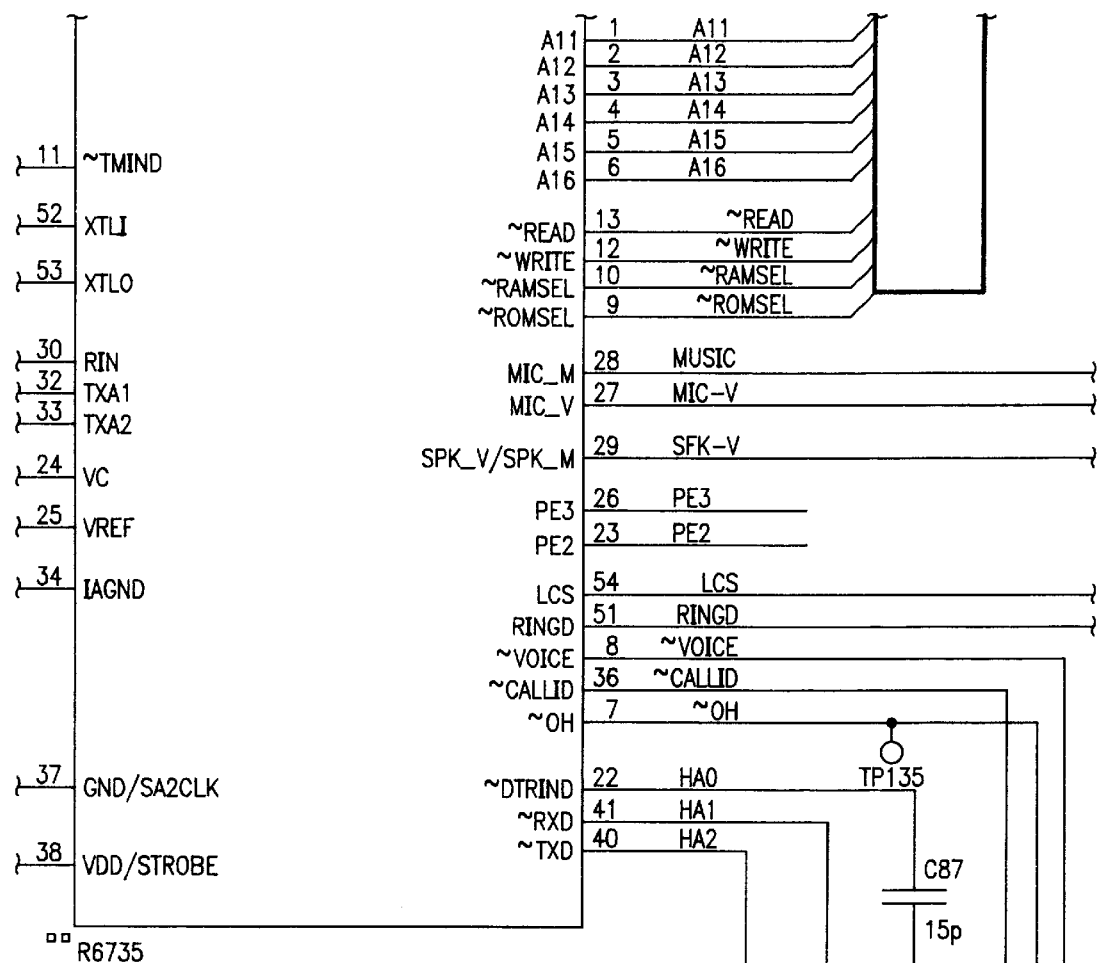
FIG. 9B
(EIGHTH SECTION OF DRAWING)
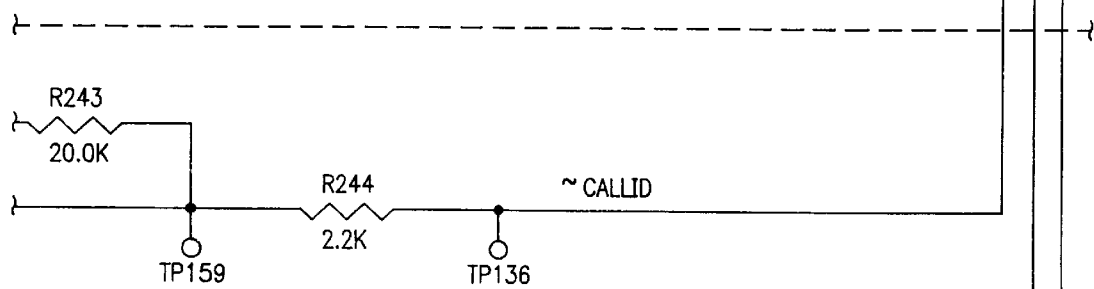

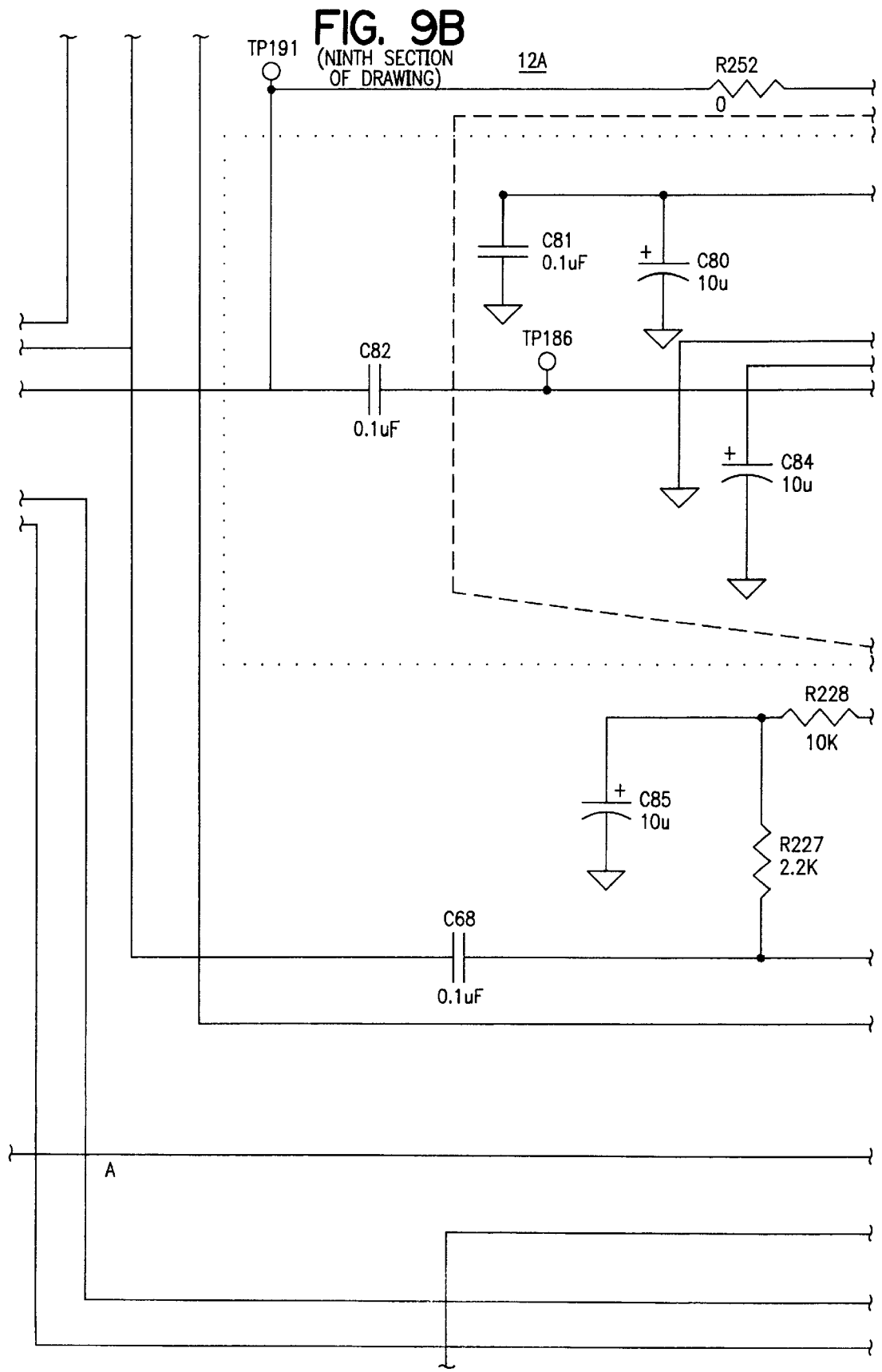

(TENTH SECTION OF DRAWING)

(ELEVENTH SECTION OF DRAWING)

(TWELFTH SECTION OF DRAWING)

(FIRST SECTION OF DRAWING)

(SECOND SECTION OF DRAWING)

(THIRD SECTION OF DRAWING)

(FOURTH SECTION OF DRAWING)

(FIFTH SECTION OF DRAWING)

(SIXTH SECTION OF DRAWING)

COMBINATION CORDLESS PHONE-FAX MODEM-COMPUTER

FIELD OF THE INVENTION

This invention relates to telecommunications and particularly to a cordless phone and computer-modem using a common transmitter and receiver.

BACKGROUND AND INFORMATION DISCLOSURE

Growth in the market of computers and telephones has resulted from innovations that have made both devices more convenient to use. In particular, the cordless telephone enables the user to move about with his/her cordless phone in a pocket or purse so that the phone is always within arms reach.

Similarly, the laptop computer is conveniently carried about for use while travelling on a train, airplane or automobile. or even to various locations in the home or office.

However, When the operator desires to fax information to or from his computer using a modem, he must have convenient access to a telephone jack that connects him to the central telephone office. This requires that a number of telephone jacks be distributed around his area and further requires that when he wishes to change locations, he must disconnect the cord to his modem from one telephone jack and reconnect to another jack at the new location.

A related problem is where the operator is riding in a public conveyance such as an airplane or train and he wishes to move from one seat to another.

Another situation that is not addressed by the present arrangement for modems and cordless phones is where the user desires to use his fax/computer at any one of a number of locations around the home or shop. At present, this requires that he have a phone jack at each location.

Cordless phones have been provided with computer capability for purposes other than the purposes discussed in foregoing paragraphs. For example, U.S. Pat. No. 4,731,814 discloses a headset provided with a microcomputer to reduce battery drain of the headset. The microcomputer is provided with a wakeup timer that periodically signals the microcomputer to determine if an RF signal is being received from the receiver. When such a signal has been received or if the headset has been removed from its cradle indicated that the user desires to operate the headset, then the microcomputer is programmed to turn on the system.

The ability to use the cordless phone interchangeably with the modem of this invention presents advantages that have not been suggested by currently available arrangements.

SUMMARY OF THE INVENTION

It is an object of this invention to provide a "combination modem-cordless phone" set for connection to a computer that would enable a user to transmit information from either the cordless phone or the computer through a modem to a local receiver connected to a central telephone office thereby providing that the user can conveniently transport his set and operate his set at any selected location within transmission range of the receiver.

It is a further object that the set be constructed to allow the operator to switch effortlessly between his phone communication and his computer communication in order that his computer communication be accompanied (almost simultaneously) by his verbal information for further enlightenment of information presented to the receiving party.

It is a further objective that the receiver be arranged to communicate with more than one (a plurality) modem-cordless phone so that a system can be setup involving several operators using their own sets simultaneously.

This invention is directed toward a modem having an RF (radio frequency) section which, in one mode, is connected to a phone and transmits and receives RF signals modulated by voice signals between the phone and a local receiver and, in another mode, is connected to a host computer through a modem section to transmit voice-band signals representing data received from and transmitted to the host computer. Switching means are accessible to the operator to conveniently switch between modes of operation.

In one configuration, the cordless or cellular phone is connected to the modem by one cable and the modem is a stand alone unit connected by a single cable to the computer. In another configuration, the modem is combined with the phone and the integral unit of phone and modem is connected to the computer by a single cable. In yet another configuration, the modem and phone are integrally formed with the computer. The system is compatible with existing software run on a personal computer or notebook.

DESCRIPTION OF THE BEST MODE

Figure 1:
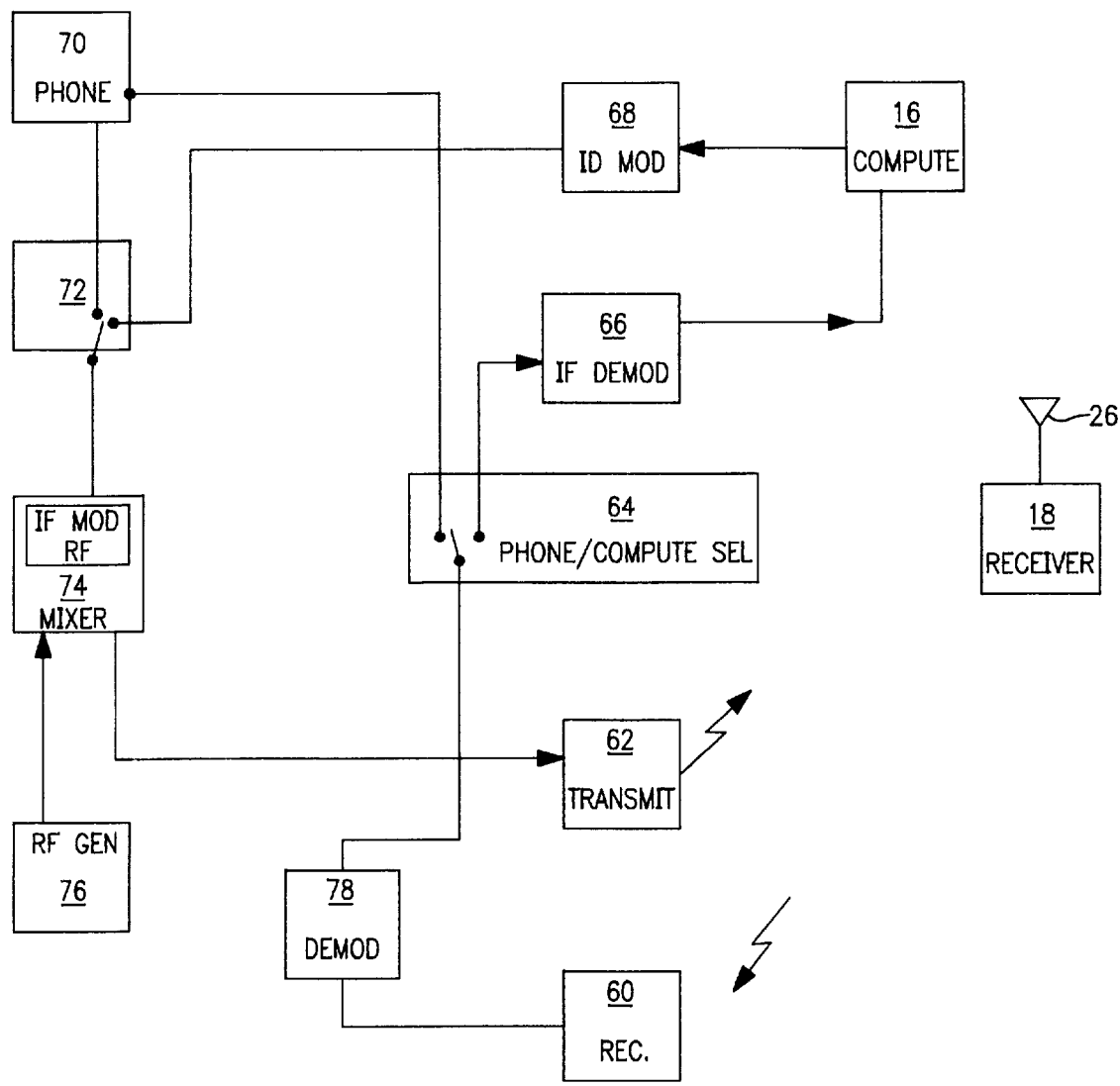
FIG. 1 is a schematic diagram illustrating functions of various sections of the invention.

Turning now to a discussion of the drawings, FIG. 1 is a schematic drawing which illustrates the functional parts of the invention. There are shown a cordless telephone 70 including a microphone and a speaker, and a host computer 16.

When the system is operating in the mode for transmitting data stored in computer 16 to a remote receiver 18 manual double throw, selection switch 72 is set to direct the data signal modulated by modulating circuit 68 to mixer 74 which is also connected to RF signal generator 76. to generate an RF signal modulated by the modulated data signal. The modulated RF signal is then input to transmitter 62 for wireless transmission to antenna 26 of receiver 18.

When the system is operating in the mode for transmitting voice data generated by microphone 38 to remote receiver 18 manual double throw, selection switch 72 is set to direct the voice data signal to mixer 74 which is also connected to RF signal generator 76. to generate an RF signal modulated by the modulated voice data signal. The modulated RF signal is then input to transmitter 62 for wireless transmission to antenna 26 of receiver 18.

When the system is operated in the mode for transmitting data received by receiver 60 from transmitter 18, to computer 16, the data signal is demodulated (the IF component is separated from the RF component) and the If component of the data signal is directed through manual double throw switch 64 to demodulater 66 which generates from the the IF signal digital data that is read into the computer.

When the system is operated in the mode for transmitting a voice signal received by receiver 60 from transmitter 18, to speaker 40, the data signal is demodulated by demonstrating circuit (78), (the IF component is separated from the RF component) and demodulated voice signal is directed through manual double throw switch 64 to speaker 40.

FIGS. 2–5 show various arrangements of the components—phone 12, fax-modem 14, computer 16, receiver 18 of the invention. The fax-modem 14 includes the modulating circuit 6 and demodulater 66 shown in FIG. 1. Each arrangement represents one of the situations presented to an operator who desires to use the invention.

Figure 2:
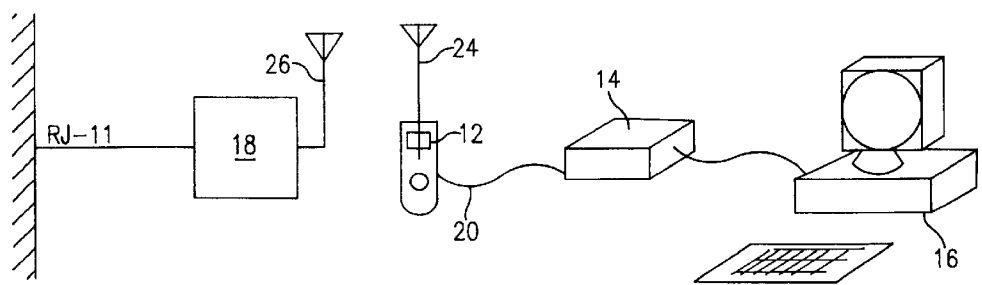
FIG. 2 shows an arrangement of this invention having a standalone cordless phone, standalone fax-modem, and stand alone computer.

FIG. 2 represents the situation where the operator has (preowns) a computer 16 connected to fax modem 14 with lead 20 normally going to a telephone jack. Instead, according to the practice of the invention, lead 20 plugs into the cordless phone 12 where it is connectable to the transmitter (not shown in FIG. 1) so that the phone and fax-modem share use of the transmitter controllable by a switch on the keypad of the phone (keypad not shown in FIG. 2)

Figure 3:
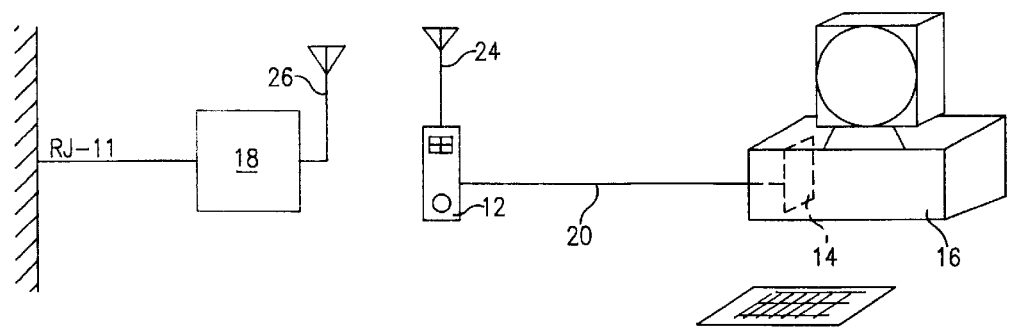
FIG. 3 shows an arrangement of this invention having a standalone cordless phone and a fax-modem board plugged into a host computer.

FIG. 3 represents the situation where the operator has (preowns) a computer with a built-in fax-modem card 14 and the cordless phone 12 has a built in jack for selective connection between the transmitter and the fax-modem card.

Figure 4:
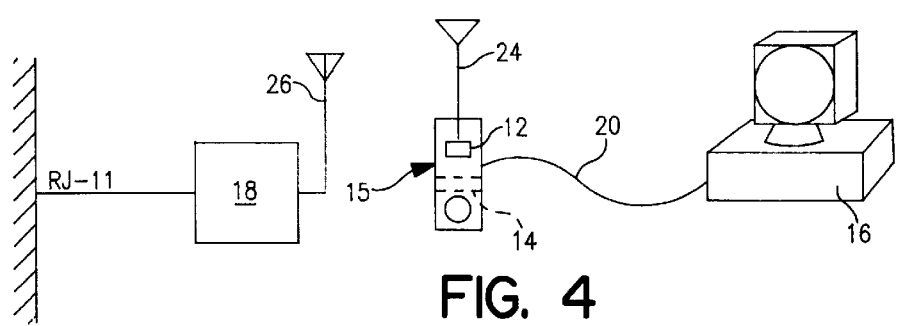
FIG. 4 shows a modem combined with a cordless phone into an integral unit connected by cable to a host computer.

FIG. 4 represents the situation where the operator has (preowns) a computer so that he purchases a combination phone and fax modem card with transmitter all contained in an enclosure 15.

Figure 5:
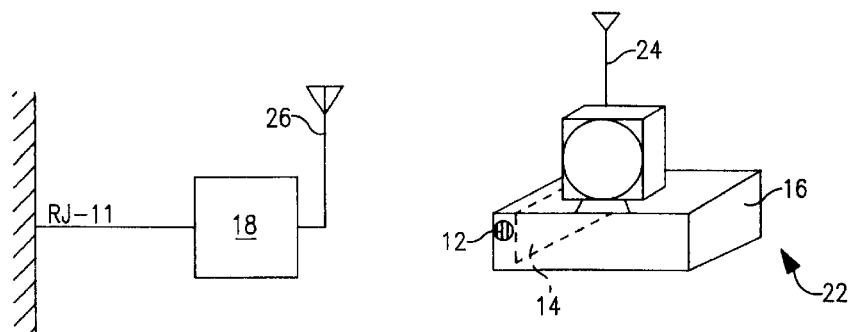
FIG. 5 shows the phone, modem and computer formed into one integral unit.

FIG. 5 represents the situation where the operator wishes to purchase a completely self contained system including a computer 16, phone 12, fax modem card 14 all contained within a single enclosure 22.

Each of the phones 12 of FIGS. 2–5 have a transmitter (not shown) and an antennae 24 communicating with a receiver base 18 having antenna 26. Receiver base 18 plugs into a telephone jack (RJ-11) for cable transmission to the central telephone exchange.

Figure 6:
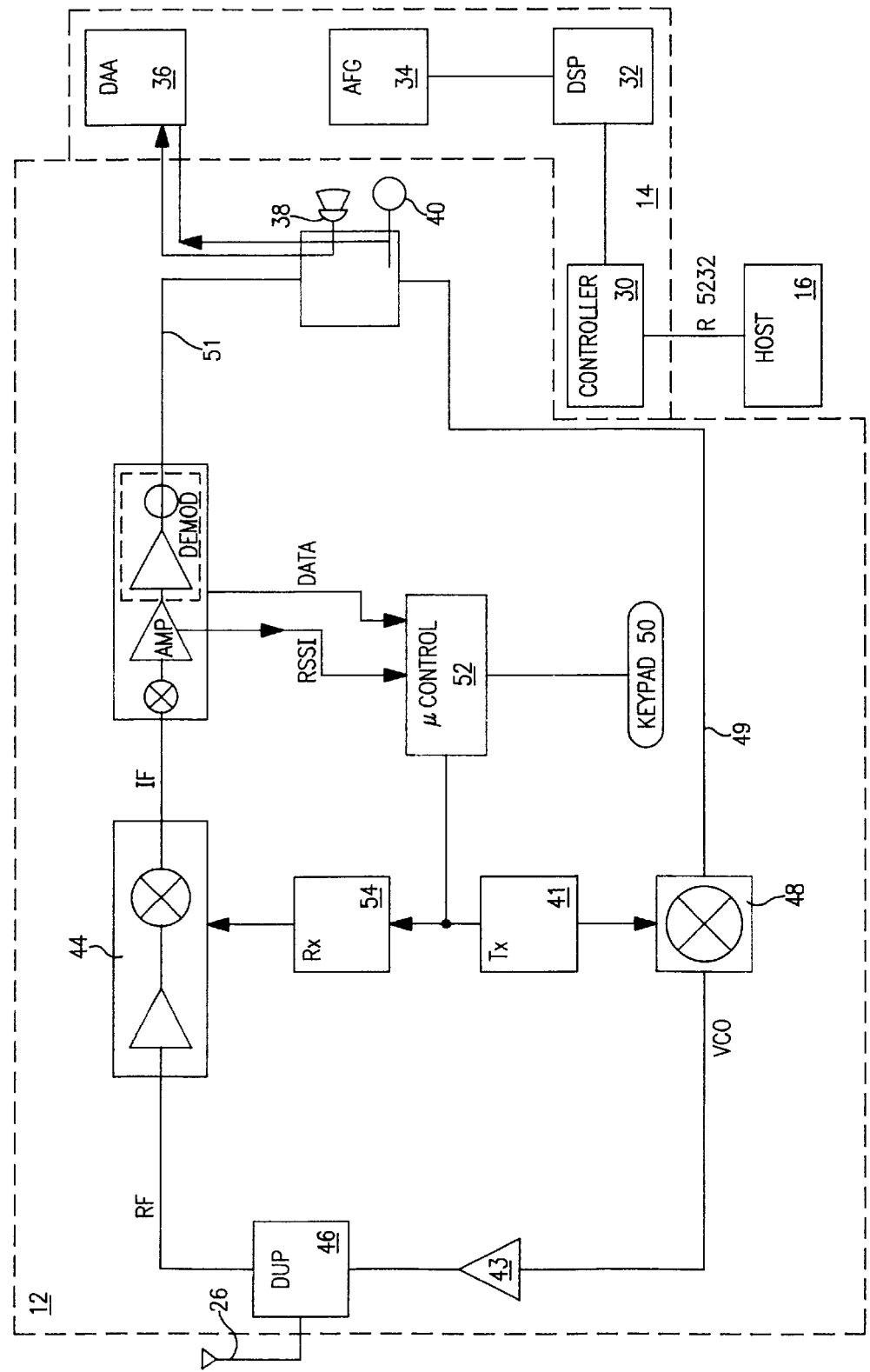
FIG. 6 is a schematic diagram according to the arrangement of FIGS. 1 and 2.
Figure 7:
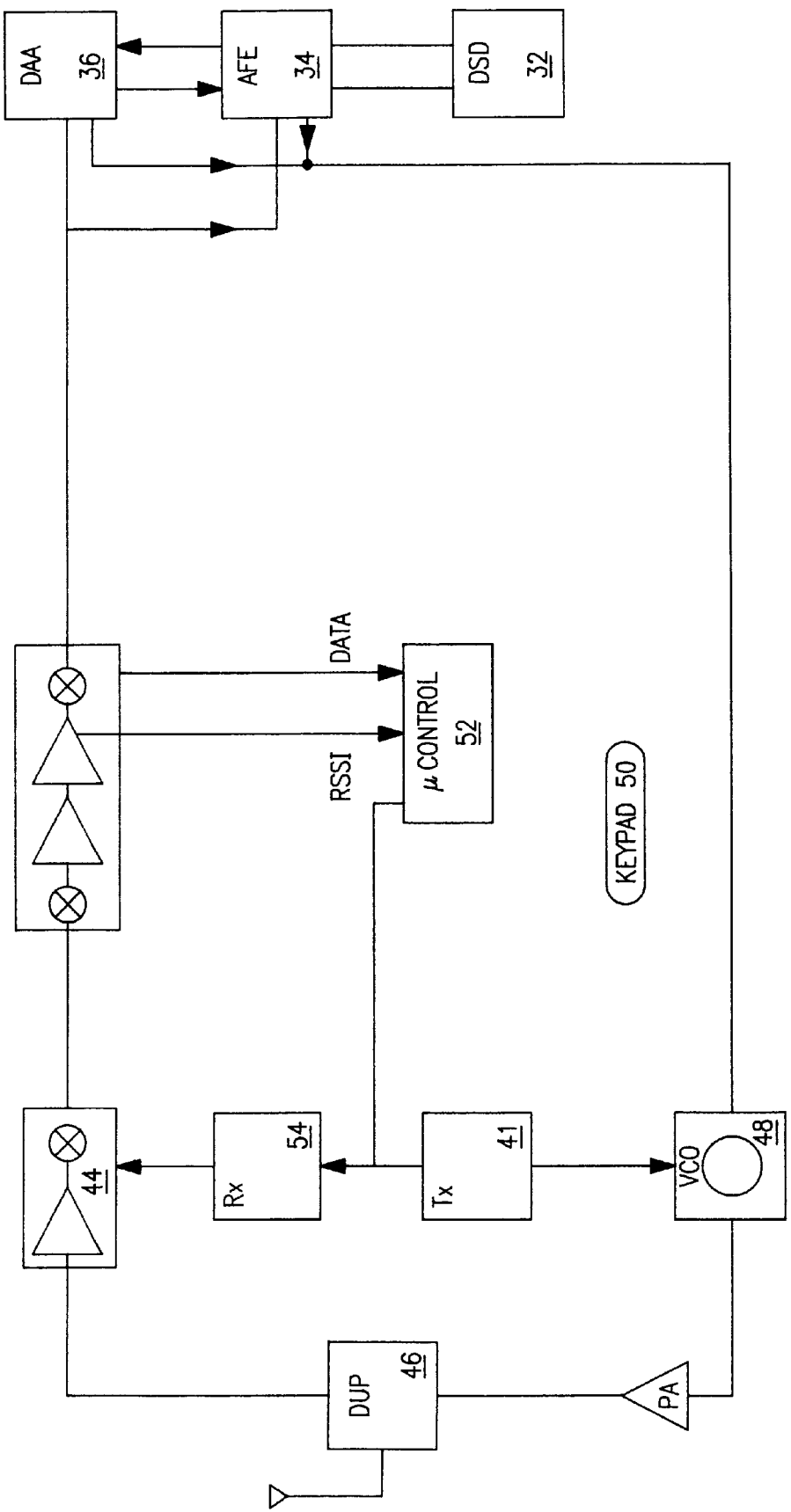
FIG. 7 is a schematic diagram according to the arrangement of FIG. 3.
Figure 8:
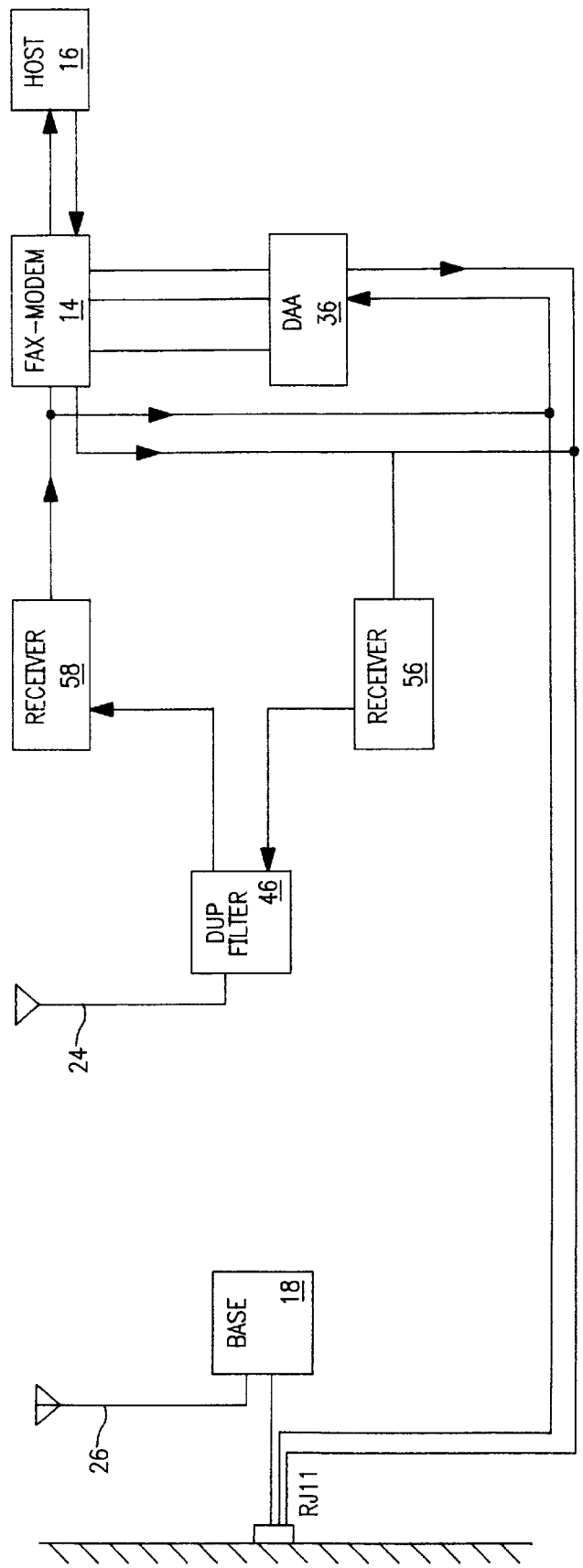
FIG. 8 is a schematic diagram according to the arrangement of FIG. 4.

Functions of various sections of the system are illustrated by the schematic diagrams of FIGS. 6, 7 and 8.

Referring to either 6, 7 or 8, There are shown the host computer 16 to which is connected the fax-modem 14 including In FIG. 5, all the components of which, according to FIG. 1 are in a separate enclosure and according to FIG. 2 are mounted onto a pc board mountable in the host computer 16:

The host computer interfaces the fax-modem controller 30 according to the EIA-232-D standard, the mechanical, electrical and functional specifications of which are described in "Data and Computer Communications" by William Stallings, 4$^{th}$ edition, published 1994 by MacMillan publishing Co., New York, incorporated by reference in this specification The RS232 connector is used in accordance with this standard. Alternatively, the interface connection may be a bus in accordance with the ISA standard. Controller 30 controls the read/write functions of the computer according to protocol well known for RS232 connection.

Alternatively, the interface between the computer and device may be a bus connection according to ISA standards as discussed in "Fast Track to SCUZI" from the Fujitsu Microelectronics<inc. Integrated Circuits Division published in 1991 by Prentice Hall, Englewood Cliffs, N.J., and which is incorporate by reference into this specification.

The controller 30 is connected to a "digital signal processor" (DSP) 32 which converts the digital data from/to the computer to/from quadrature phase modulated digital data. The quadrature phase modulated signal data is converted to/from an audio signal waveform using companding techniques described the reference by Stallings cited above (pages 116–117). Conversion is performed by the "audio front end" 34 (AFE).

The DAA 36 (data access arrangement) connects the AFE 34 to line 49 for data transmission or line 51 for data reception.

In the transmission mode, functions of the system are controlled by keypad 50 operated by the user whereby signals from the keypad transmit voice signals from speaker 38, or alternatively audio frequency data signals from DAA modulate an RF signal in mixer 48 for transmission through power amplifier and duplex filter 46 to broadcasting antenna 26. The frequency of the RF signal is voltage controlled by a the D.C. voltage from synthesizer 41 selected by the operator depressing the appropriate keys of key pad 52 connected to U-controller 52.

In the receiving mode, R$_x$ synthesizer 54 under control of U-controller 53 generates a dc signal whose value selects and demodulates the RF signal in mixer 44 from antenna 26. An IF signal is provided which is amplified then further demodulated to output an audio signal from demodulator 42. The audio signal is then routed by the U-Controller to either speaker 38 or through the DAA 36 to the AFE 34, DSP32, controller 30 and computer 16.

FIG. 6 corresponds to the arrangements of FIGS. 2 and 3, in which the fax-modem 14 is in a separate enclosure according to FIG. 2 or on a fax card plugged into computer 16 according to FIG. 3. Fax-modem 14 includes the DAA 36, AFE 34, DSP 34, and controller 30. The handset 12 includes the keypad 50, the U-controller 52, speaker 38, microphone 40, mixer 48, power amplifier 43, , duplex filter 46, receiving synthesizer 54, transmitting synthesizer 41, FIG. 7 corresponds to the arrangement shown in FIG. 4 in which the fax-modem electronics is integrated with the hand set to provide an integral unit combined in one enclosure. 15.

In this embodiment, there is no speaker 38 or microphone 40 and the system is fax-computer combination that communicates wirelessly with a remote system (not shown) selected by the keypad 50.

FIG. 8 is an arrangement in which the fax computer 16 can communicate through the DAA 36 with a remote system with either a central exchange using a RJ-11 connector or by wireless communication with a base station 18.

Figure 9A:
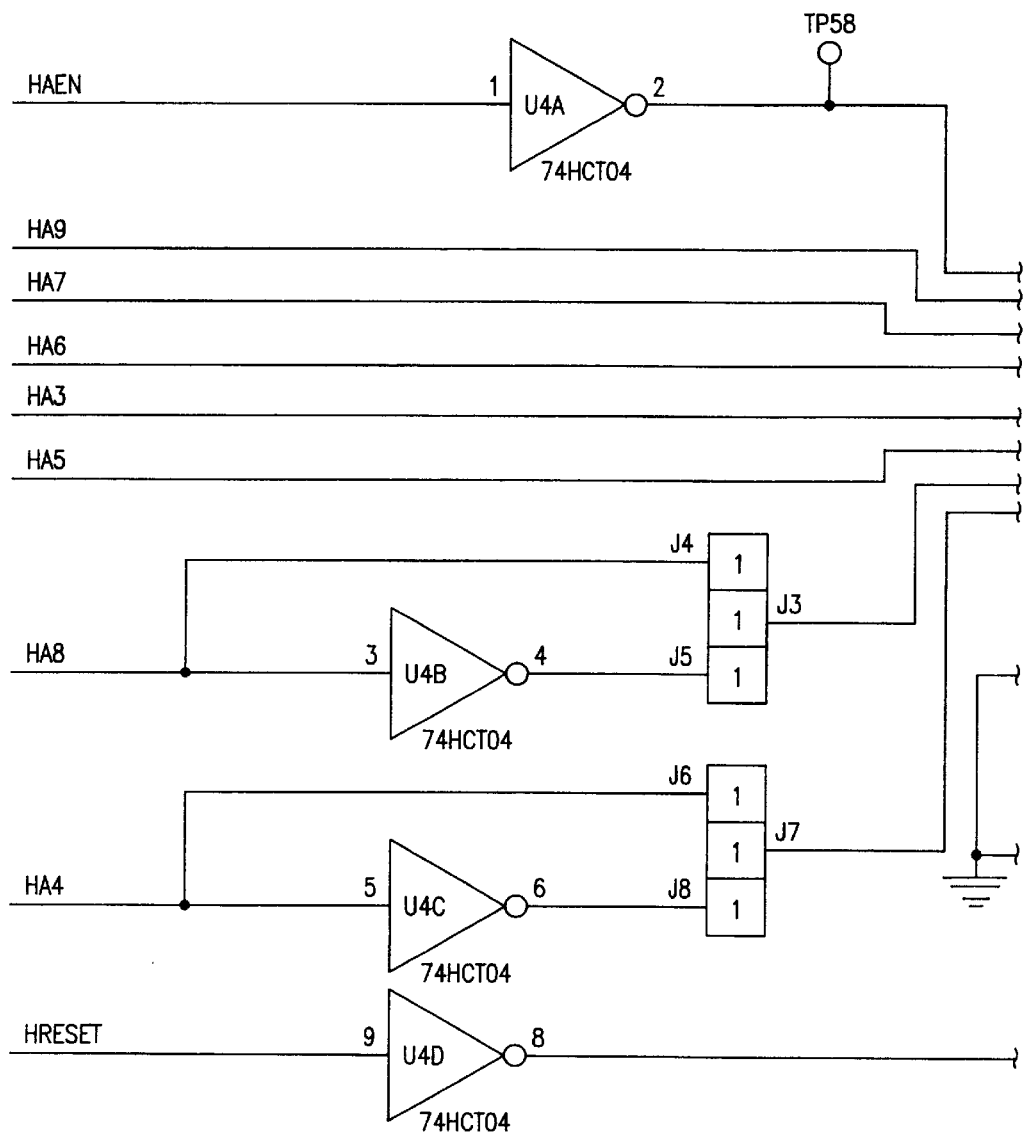
FIG. 9A–9C are circuit diagrams showing details of the FAX-modem of this invention.
Figure 9A:
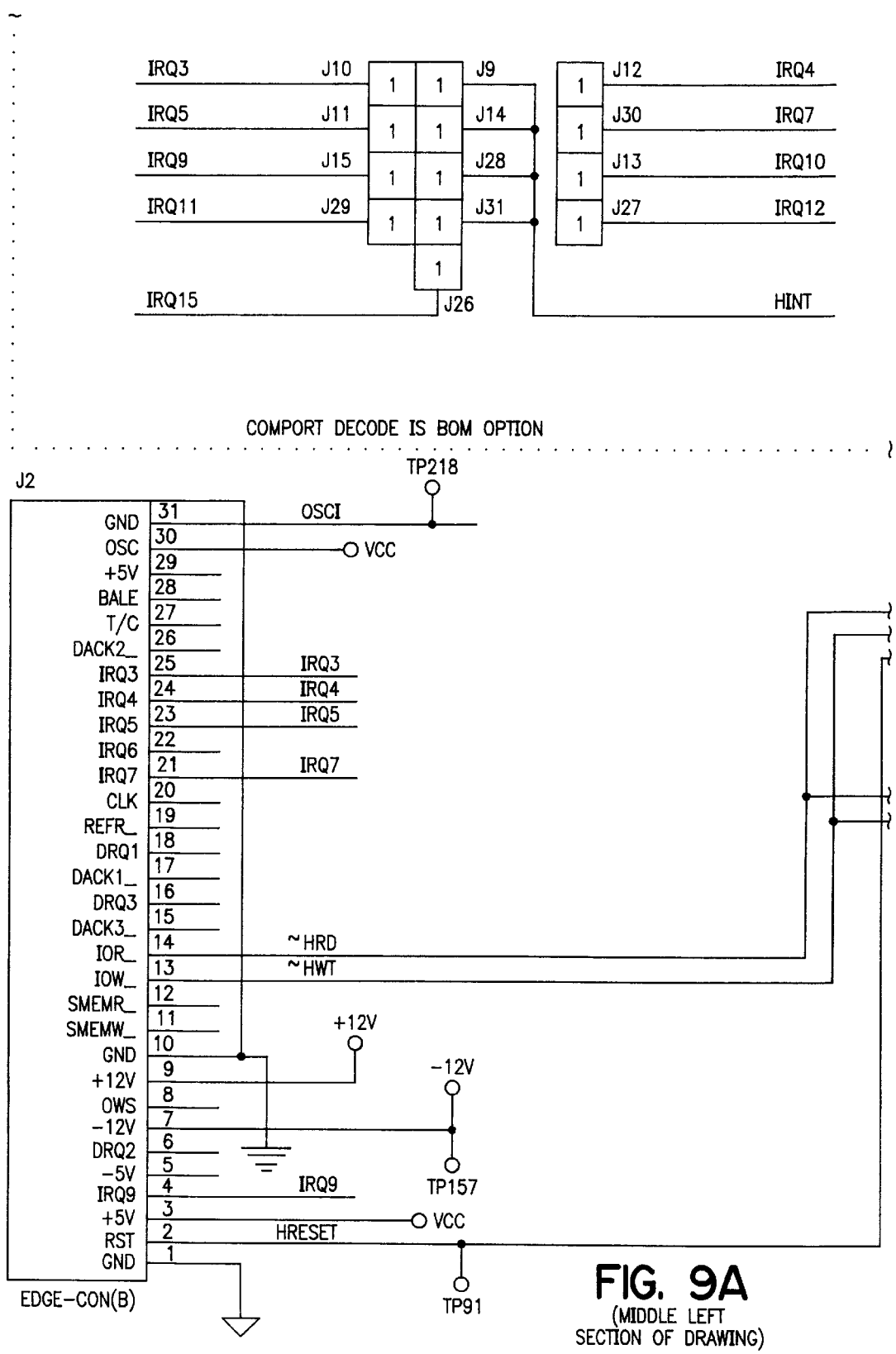
Figure 9A:
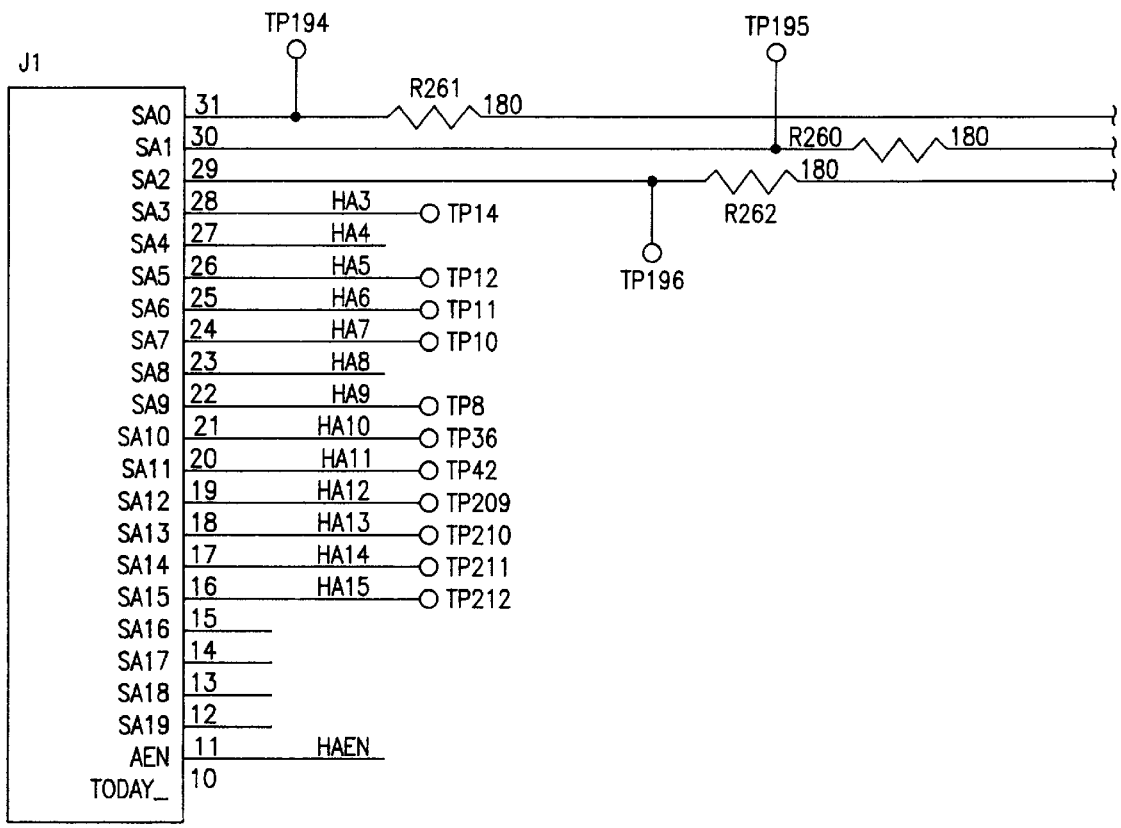
Figure 9A:
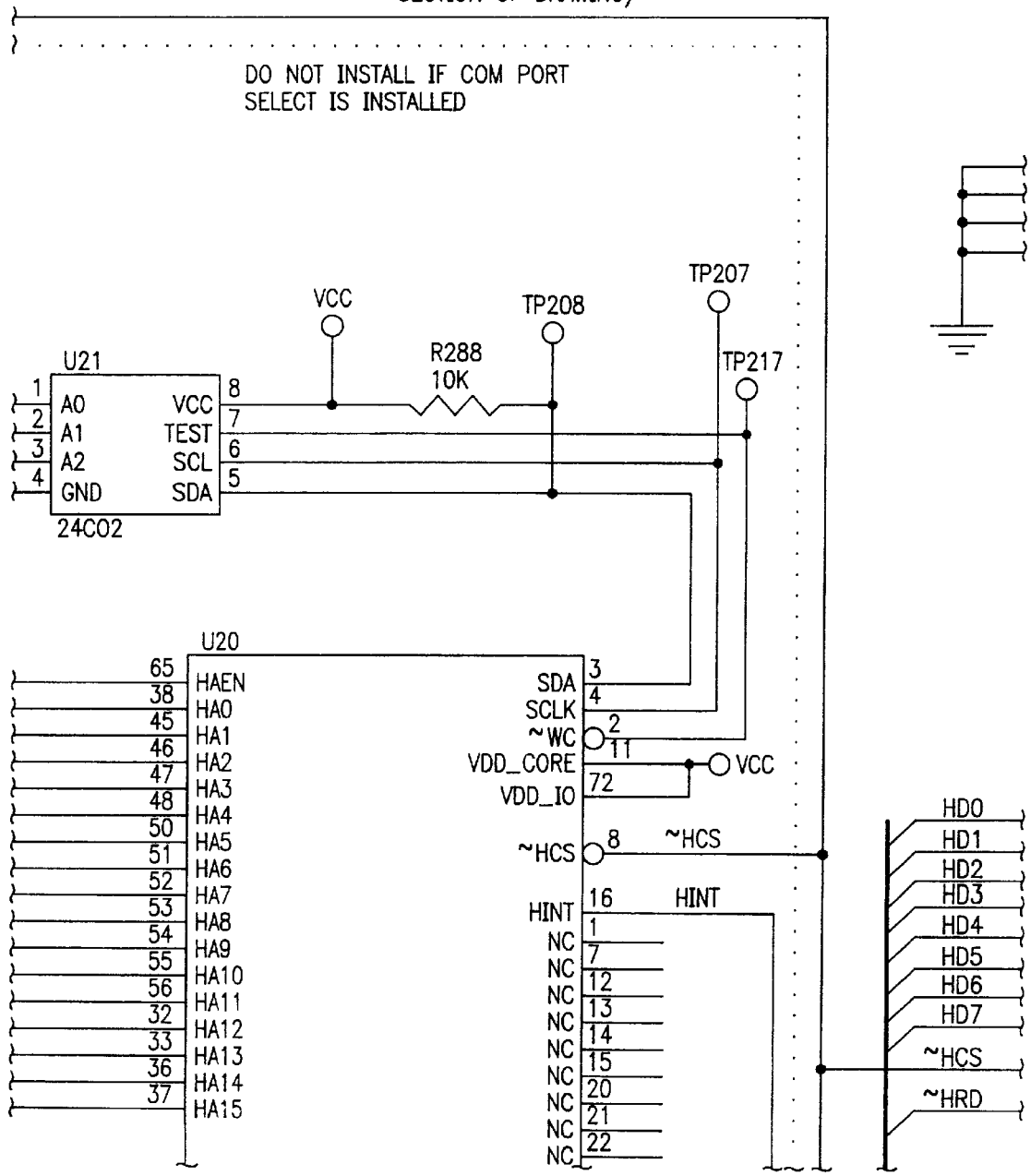
Figure 9A:
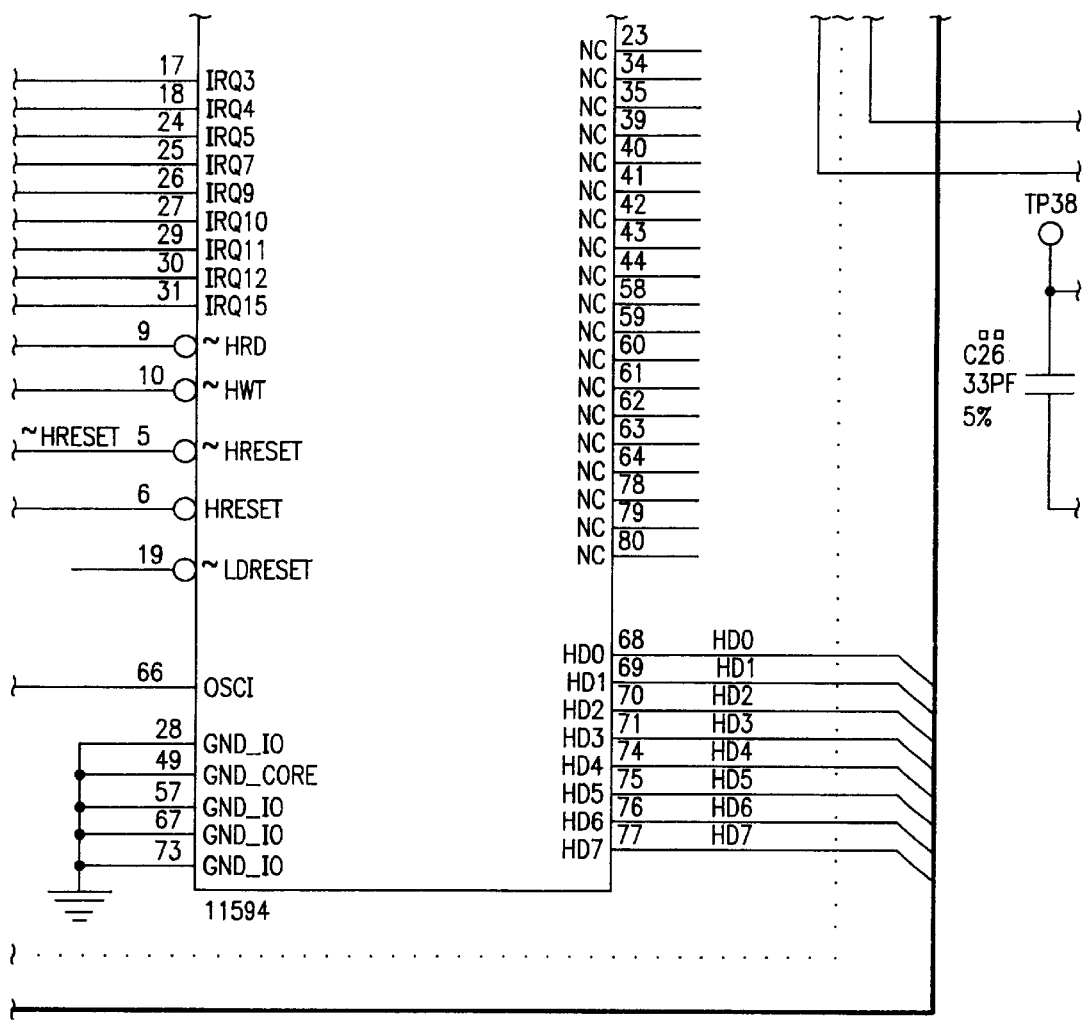
Figure 9A:
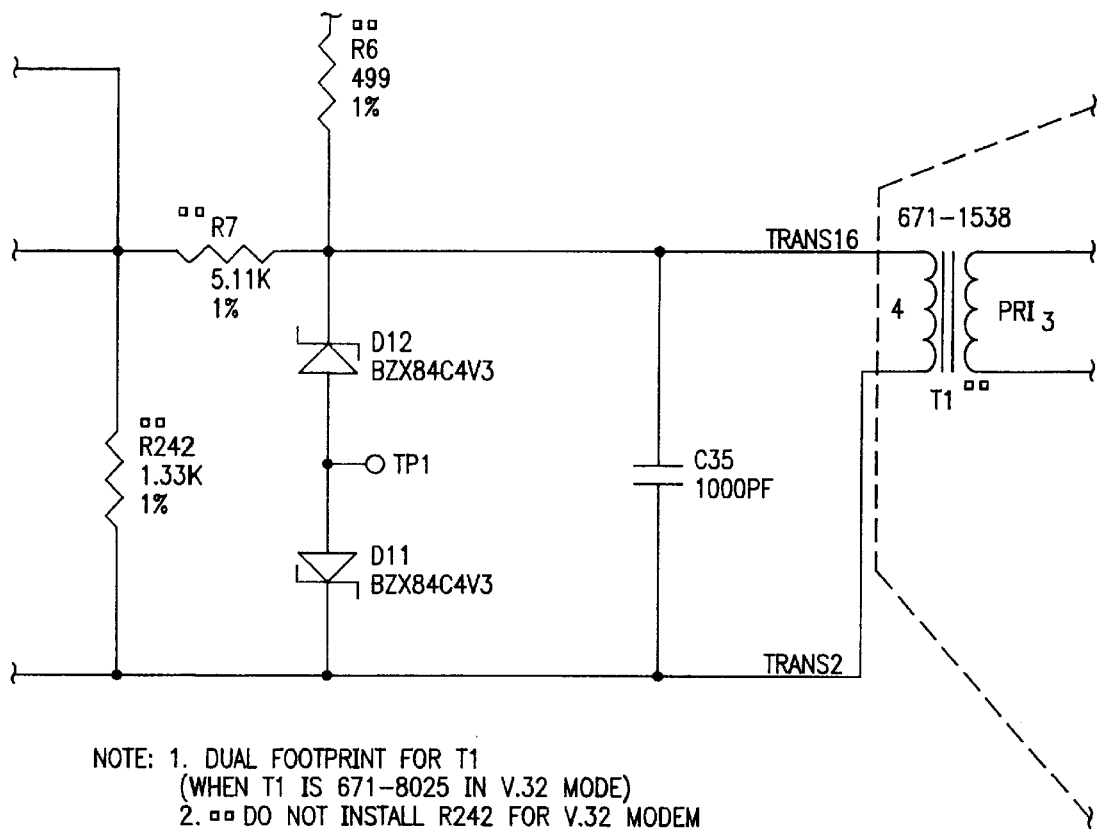
Figure 9A:
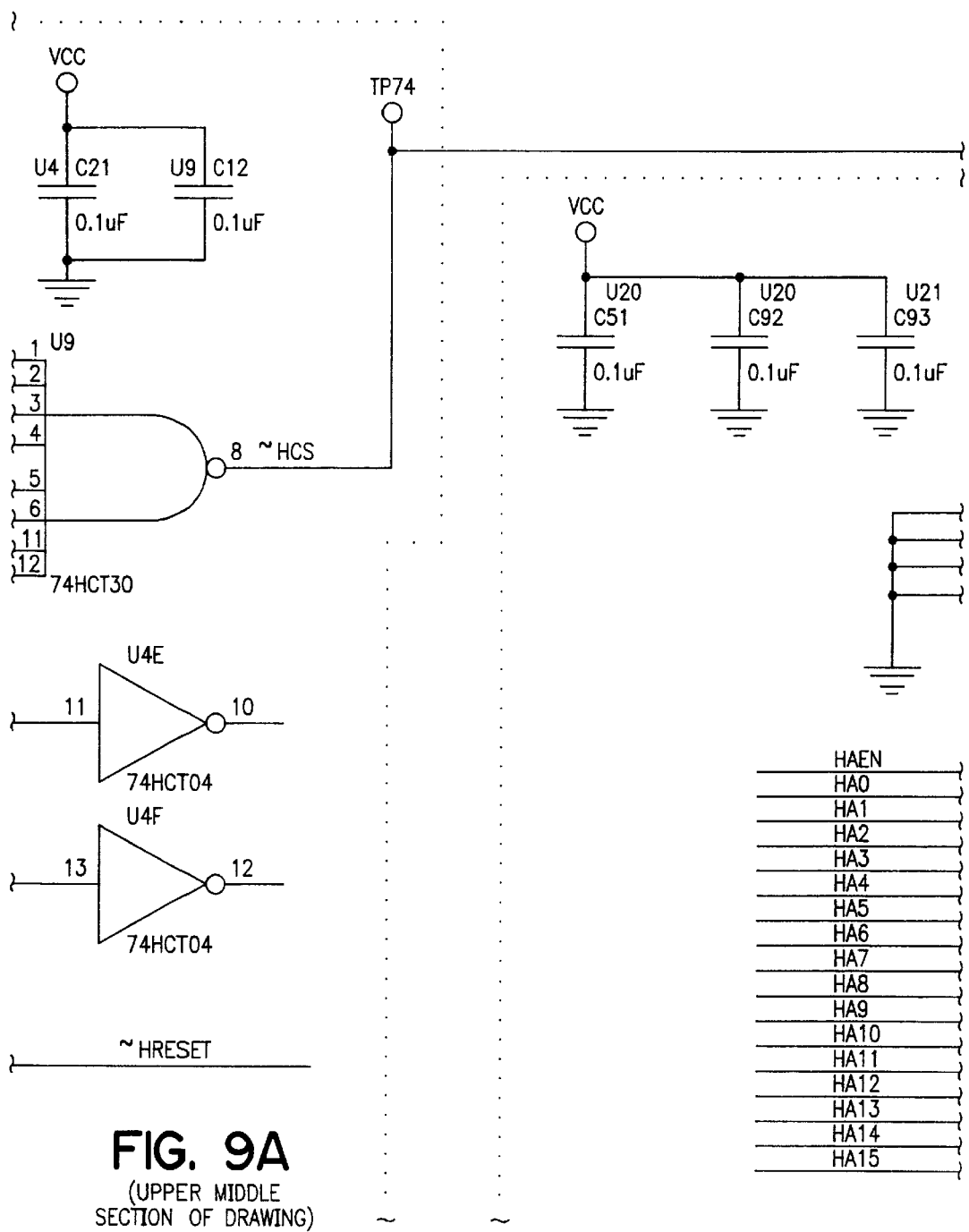
Figure 9A:
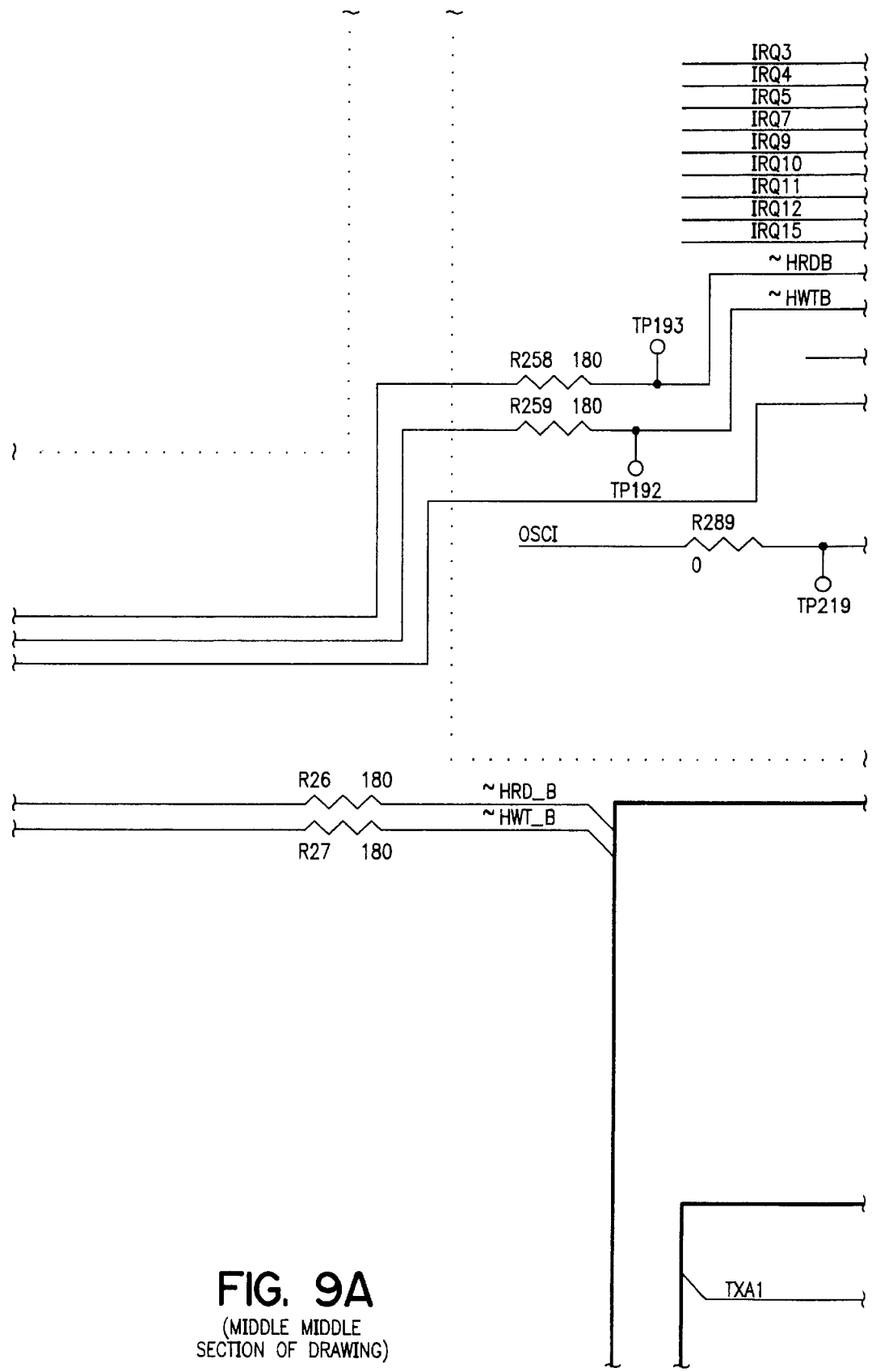
Figure 9A:
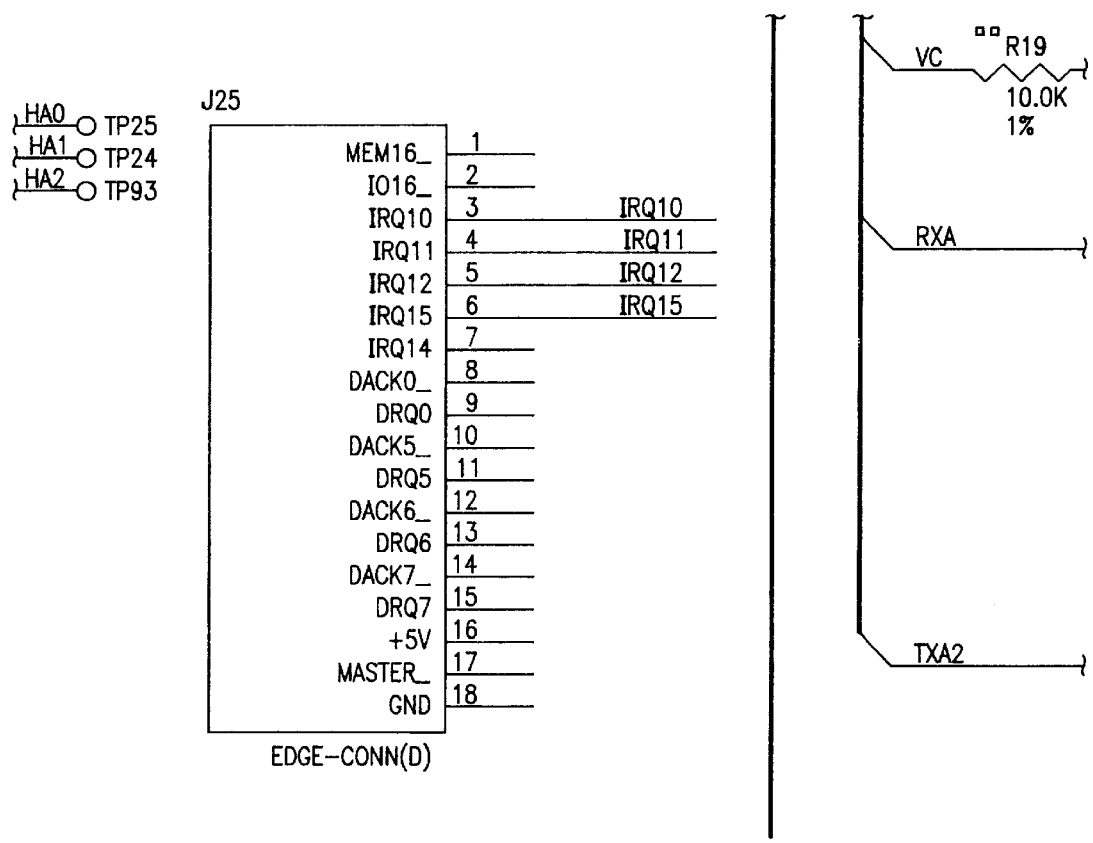
Figure 9B:
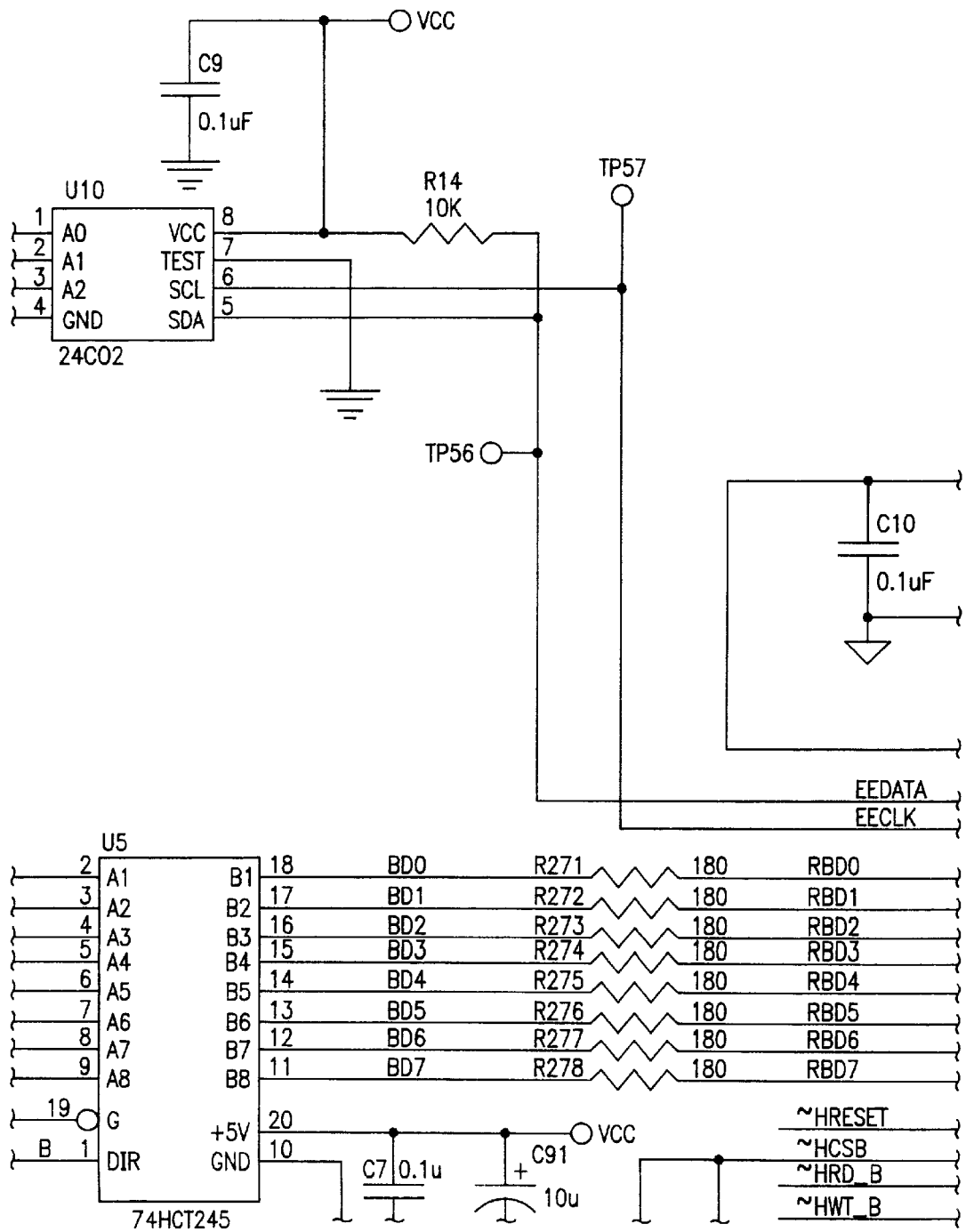
Figure 9B:
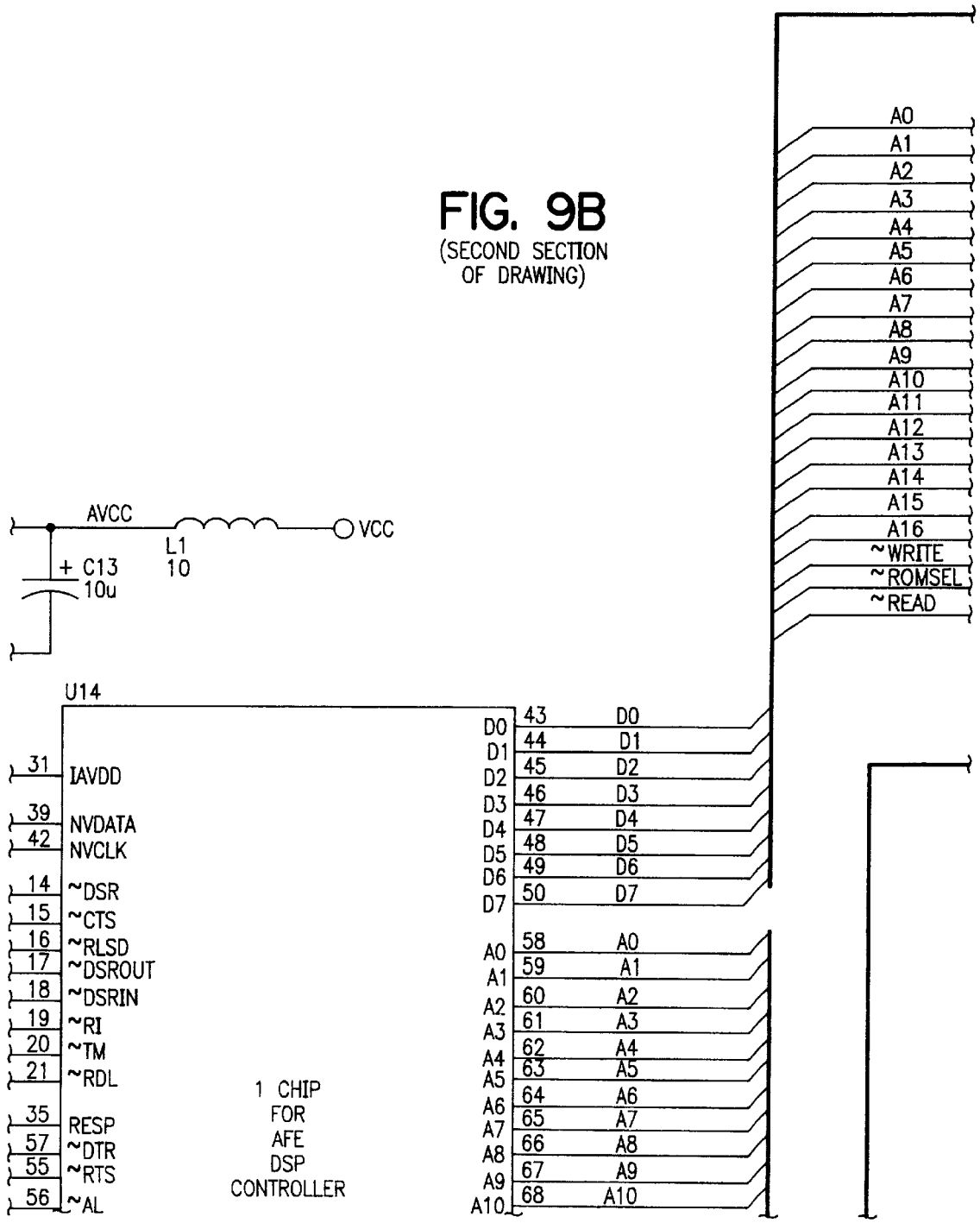
Figure 9B:
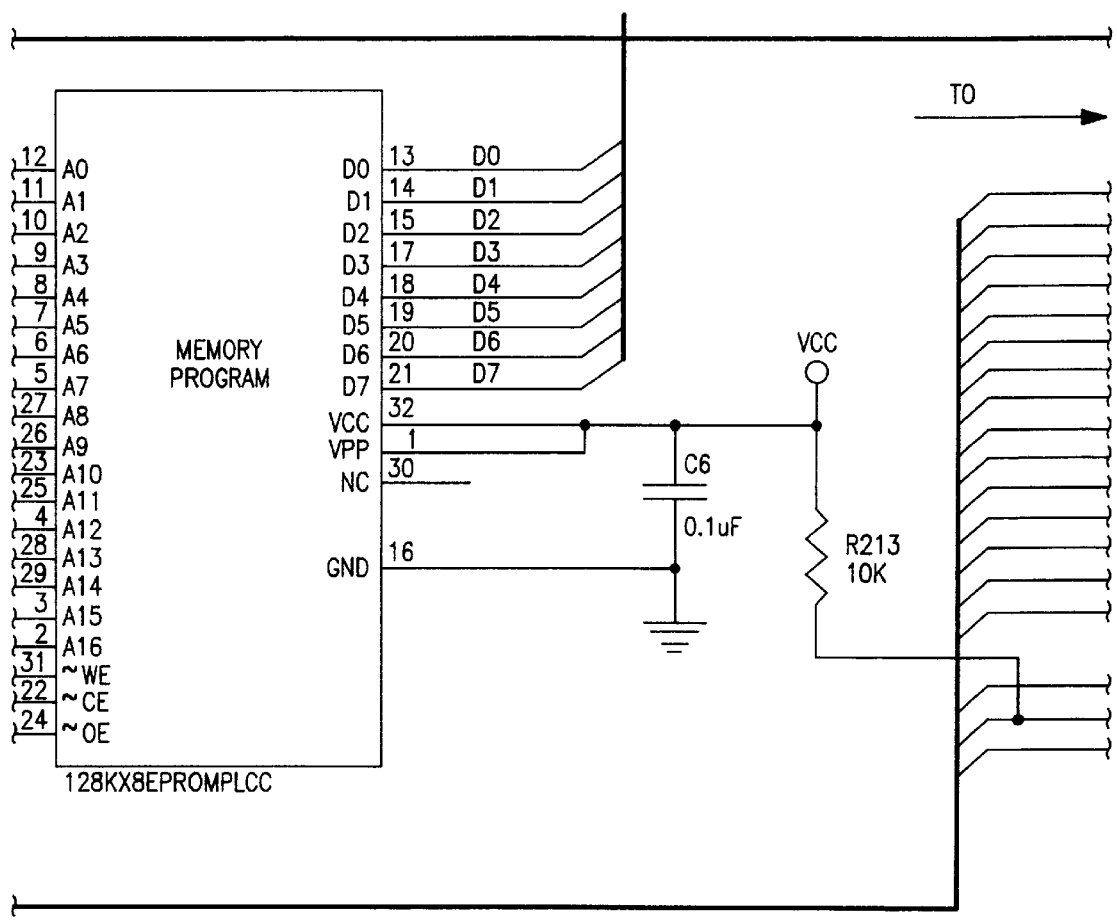
Figure 9B:
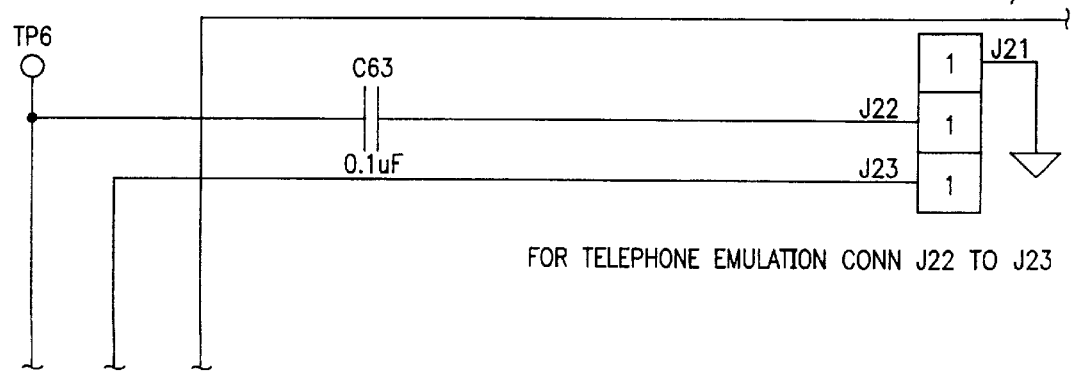
Figure 9B:
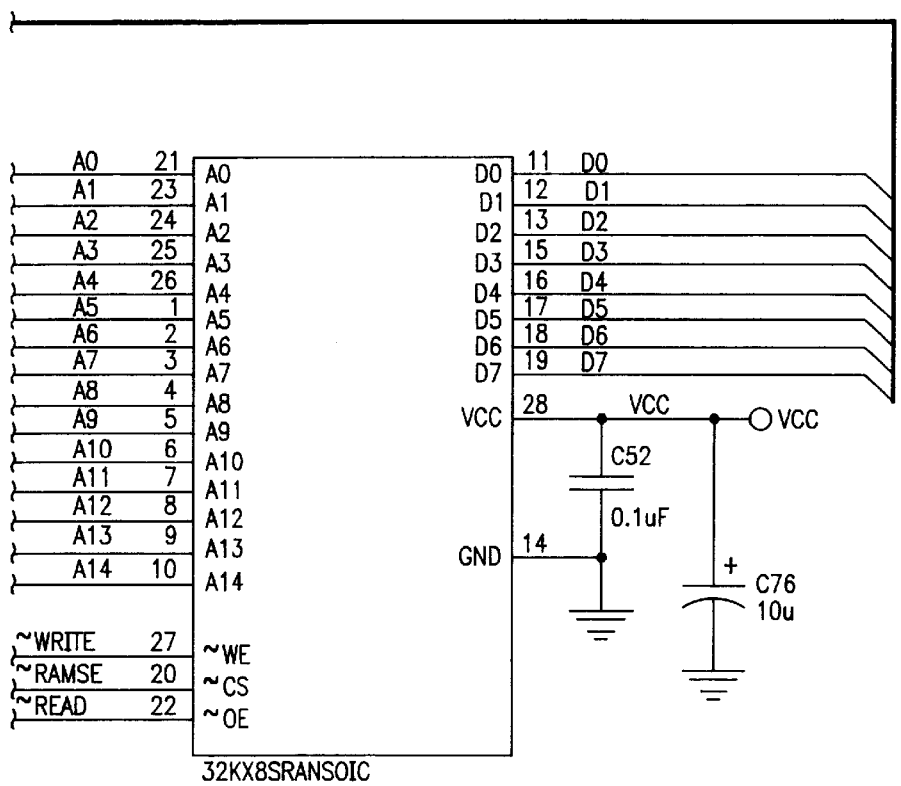
Figure 9B:
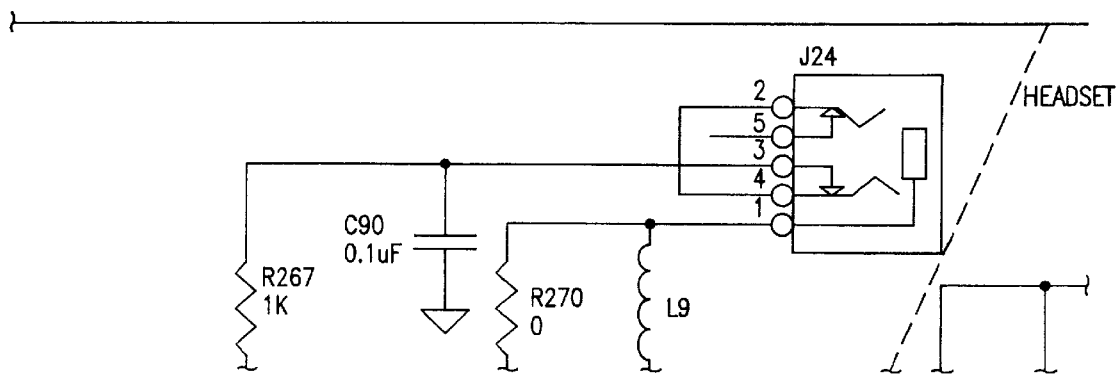
Figure 9B:
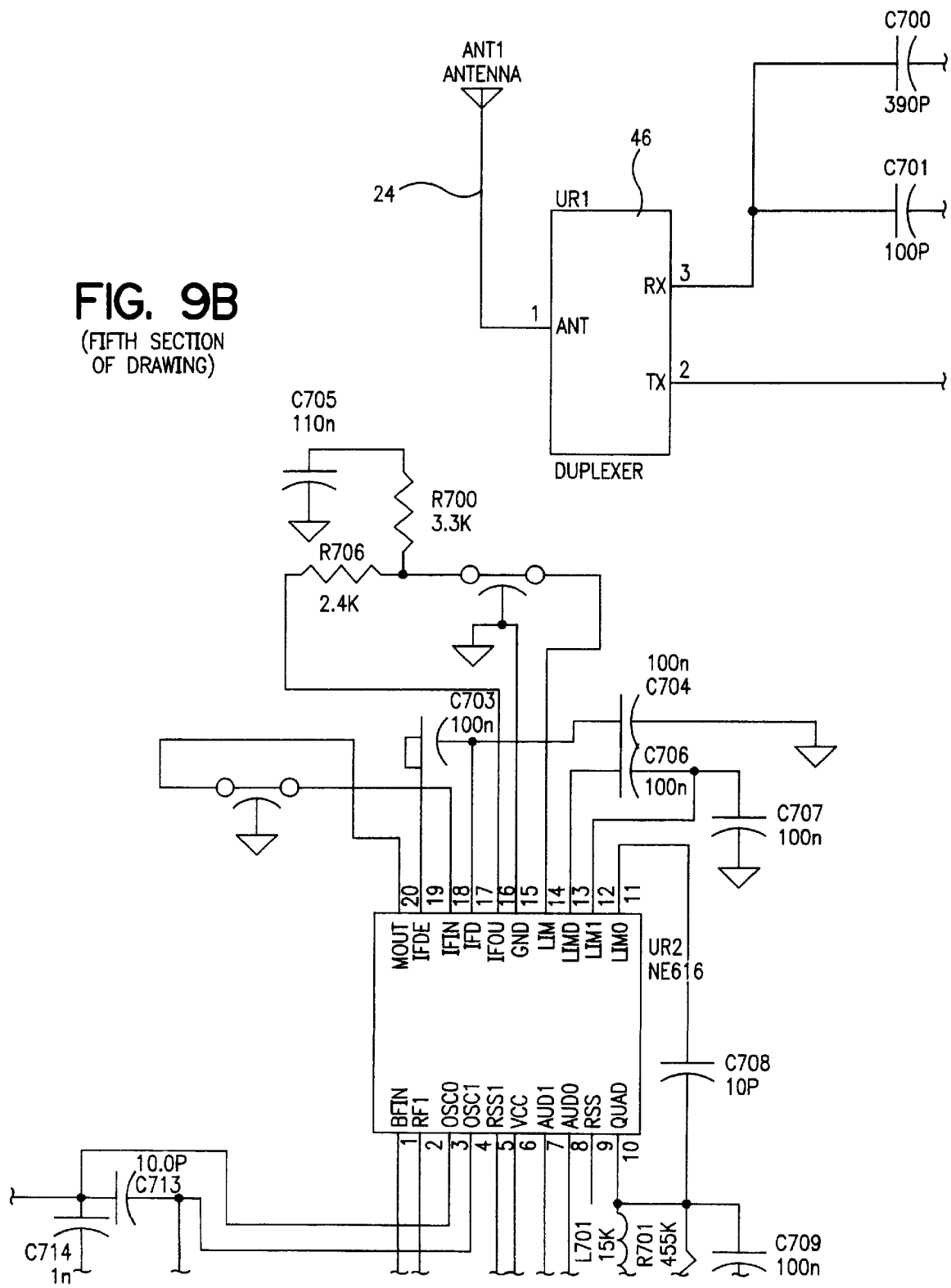
Figure 9B:
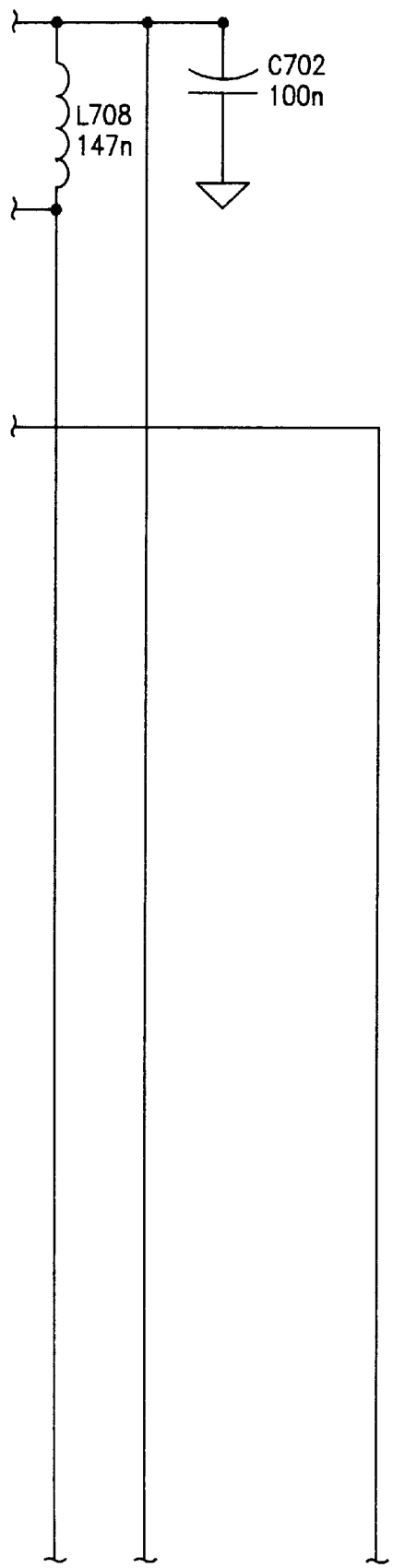
Figure 9B:
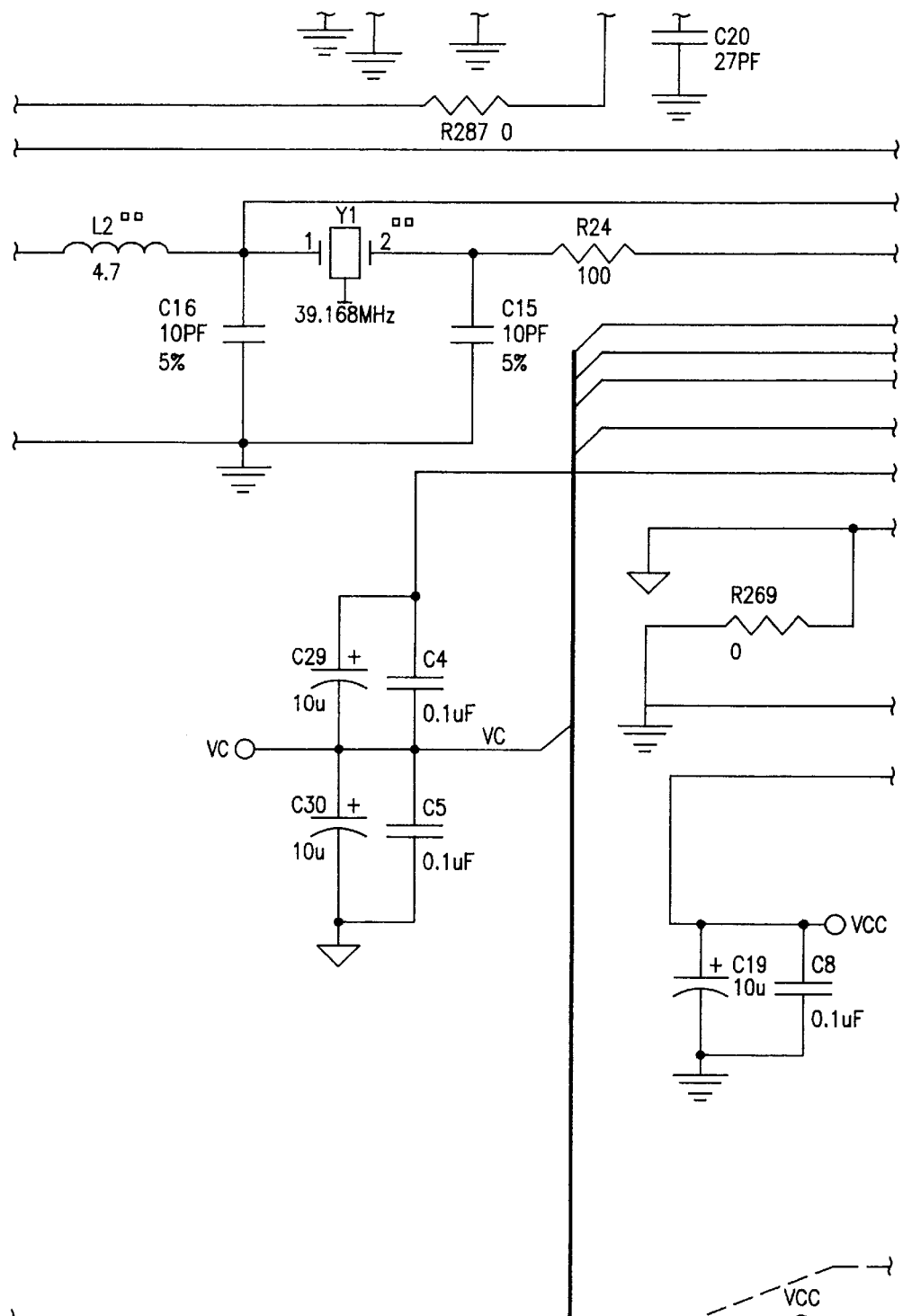
Figure 9B:
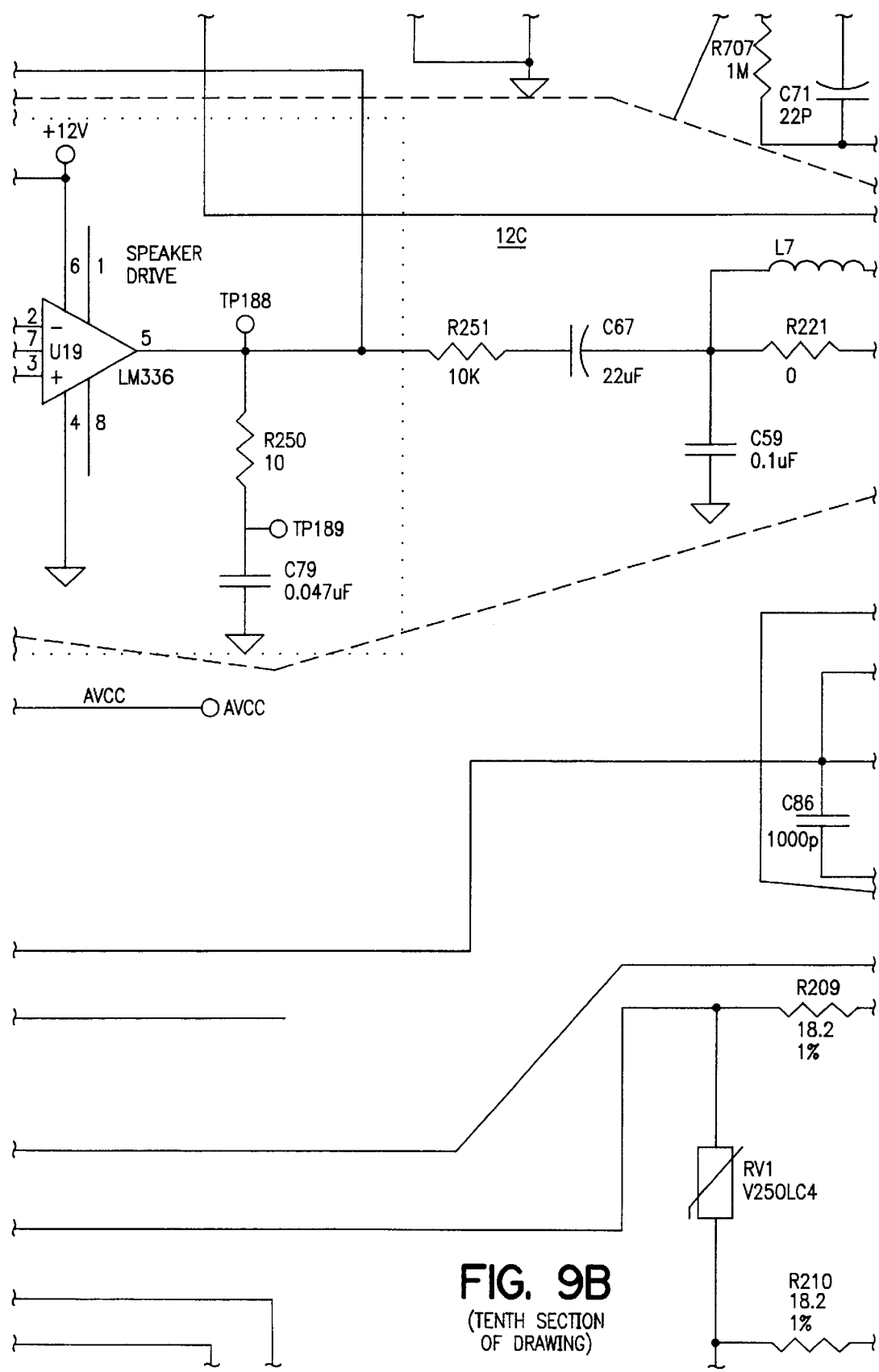
Figure 9B:
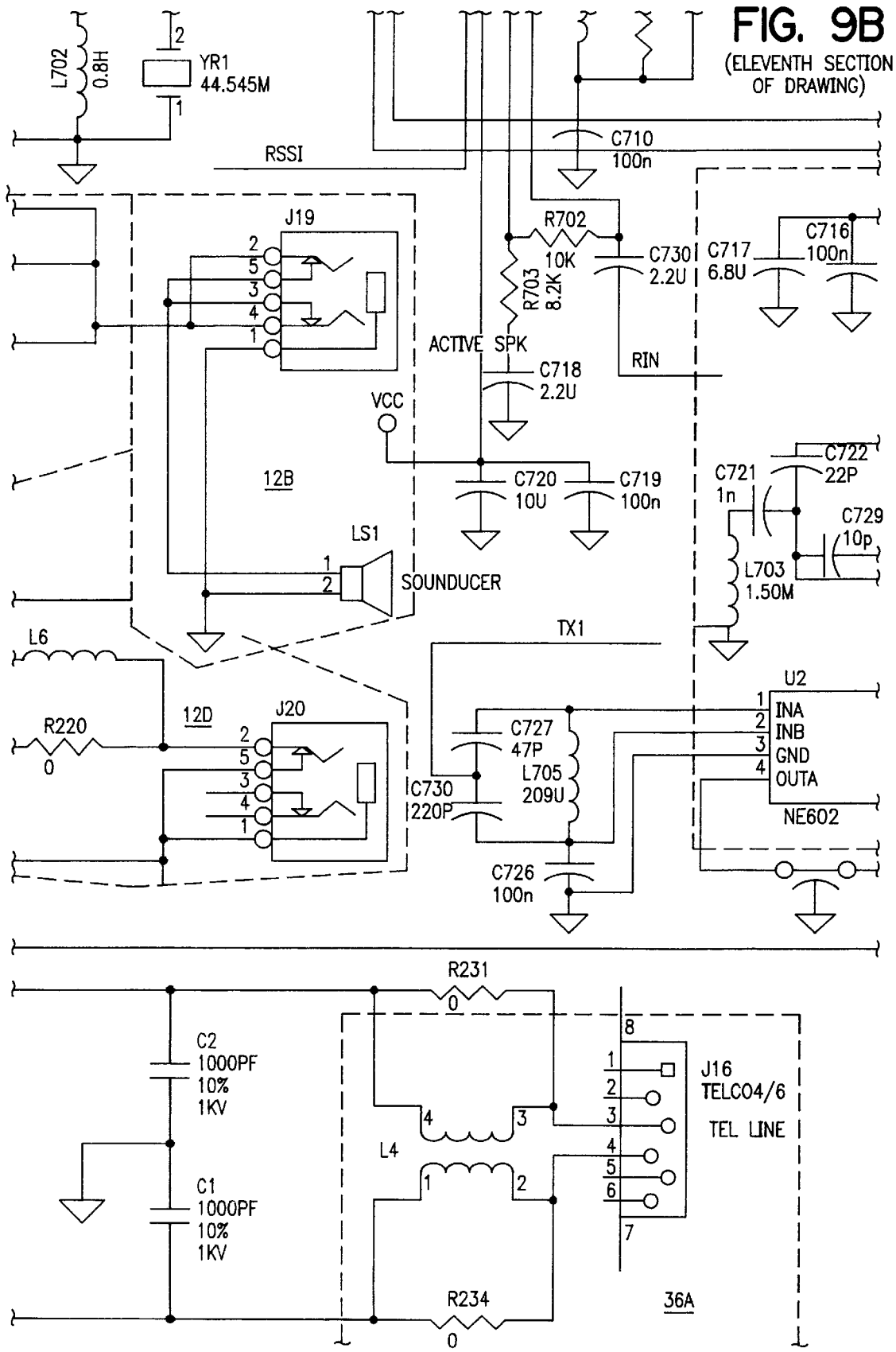
Figure 9B:
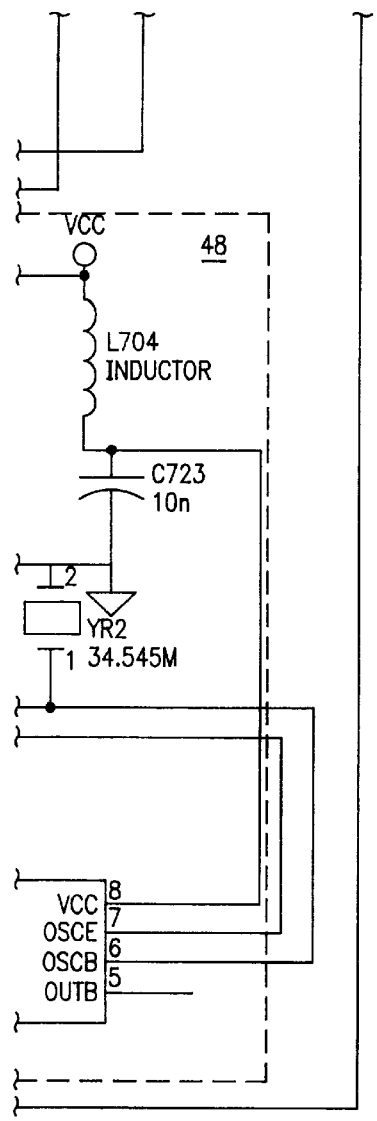
Figure 9C:
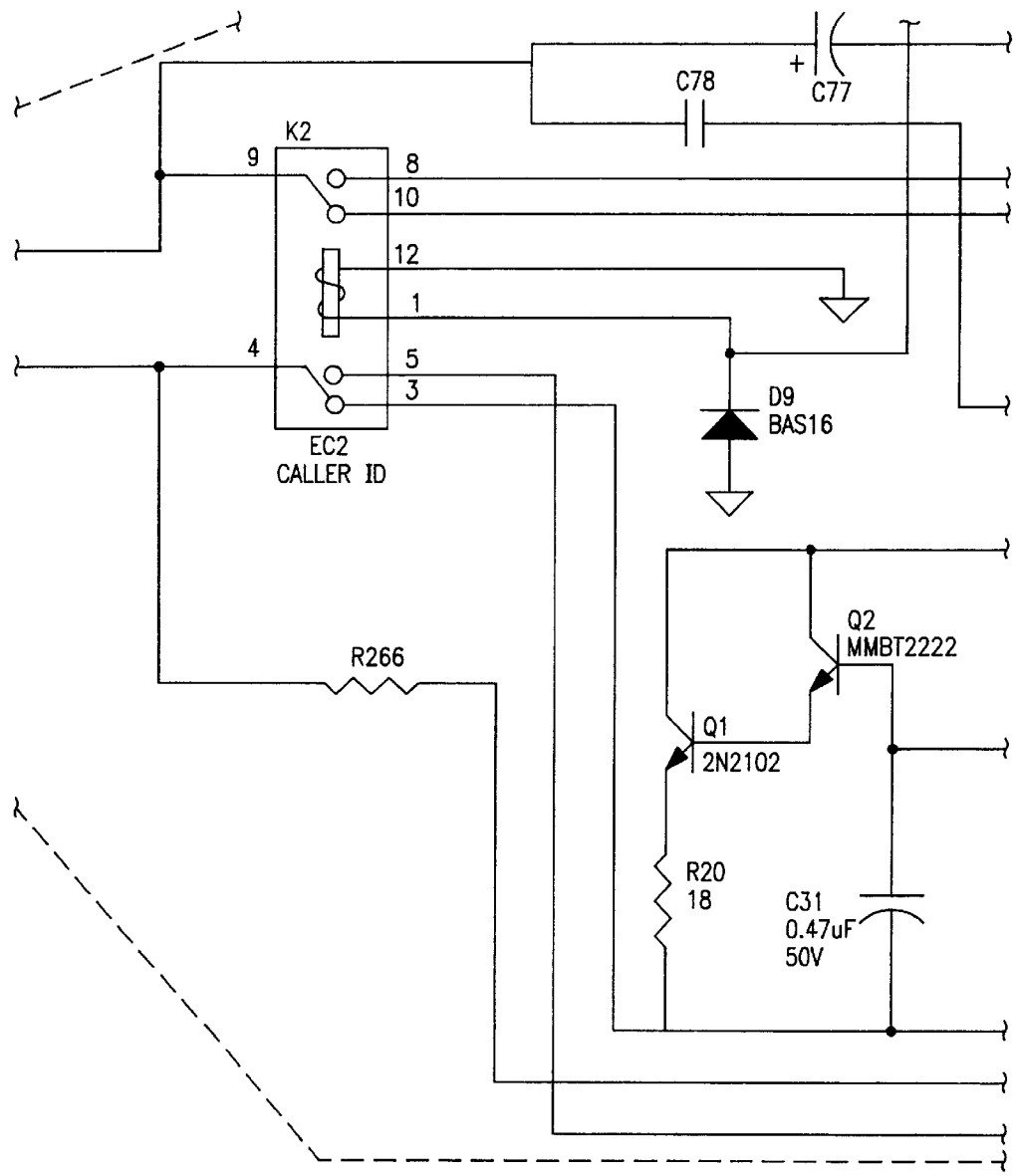
Figure 9C:
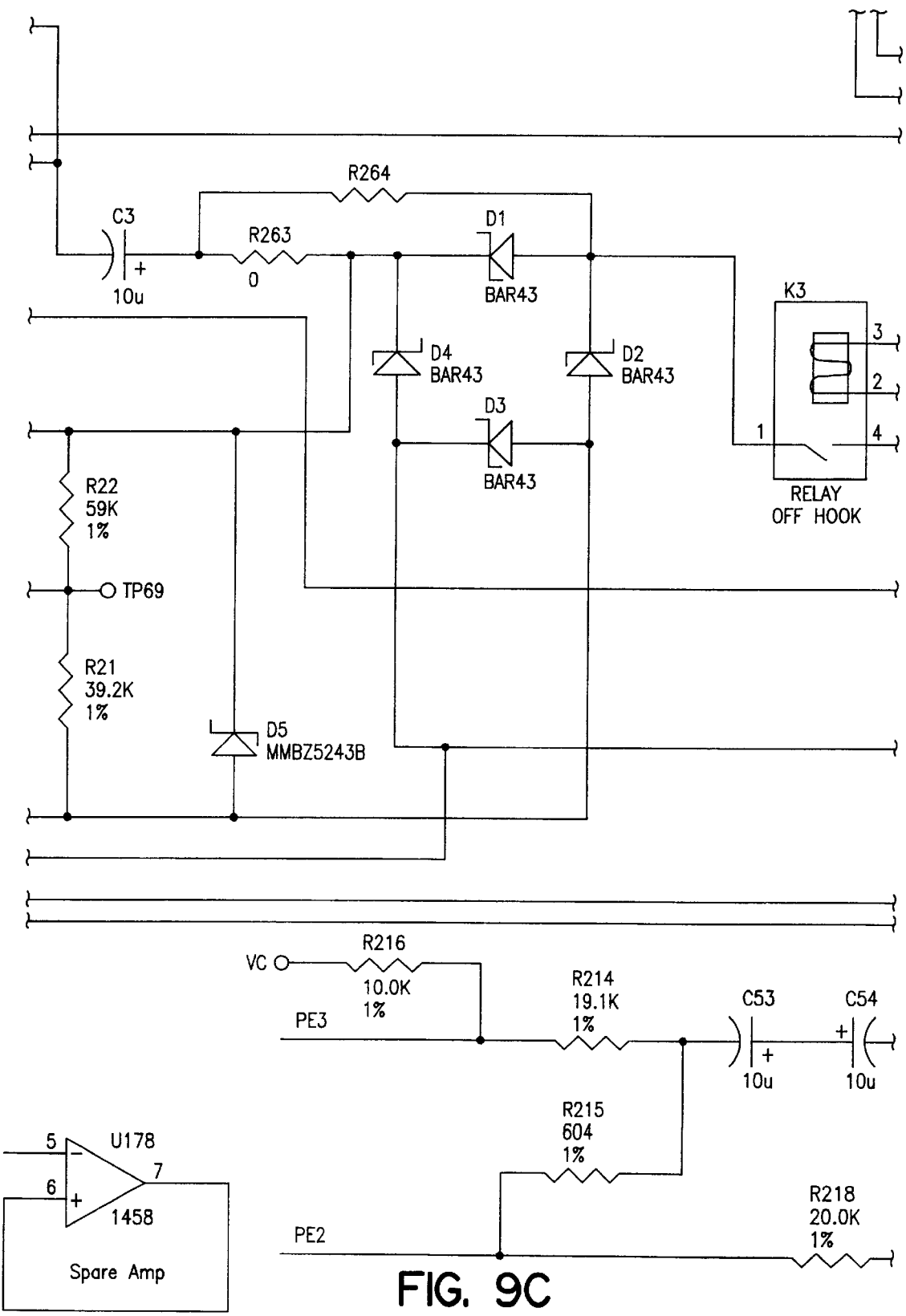
Figure 9C:
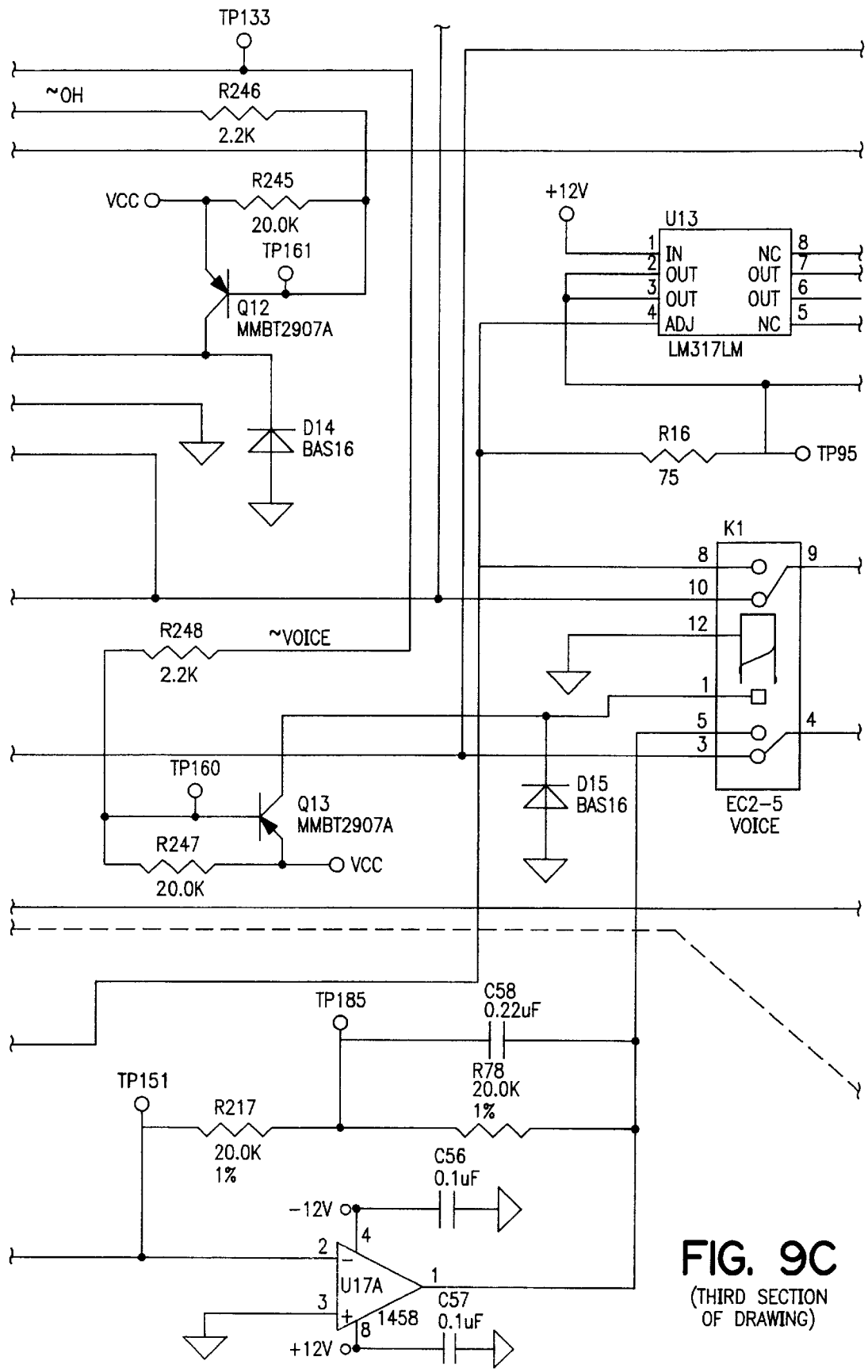
Figure 9C:
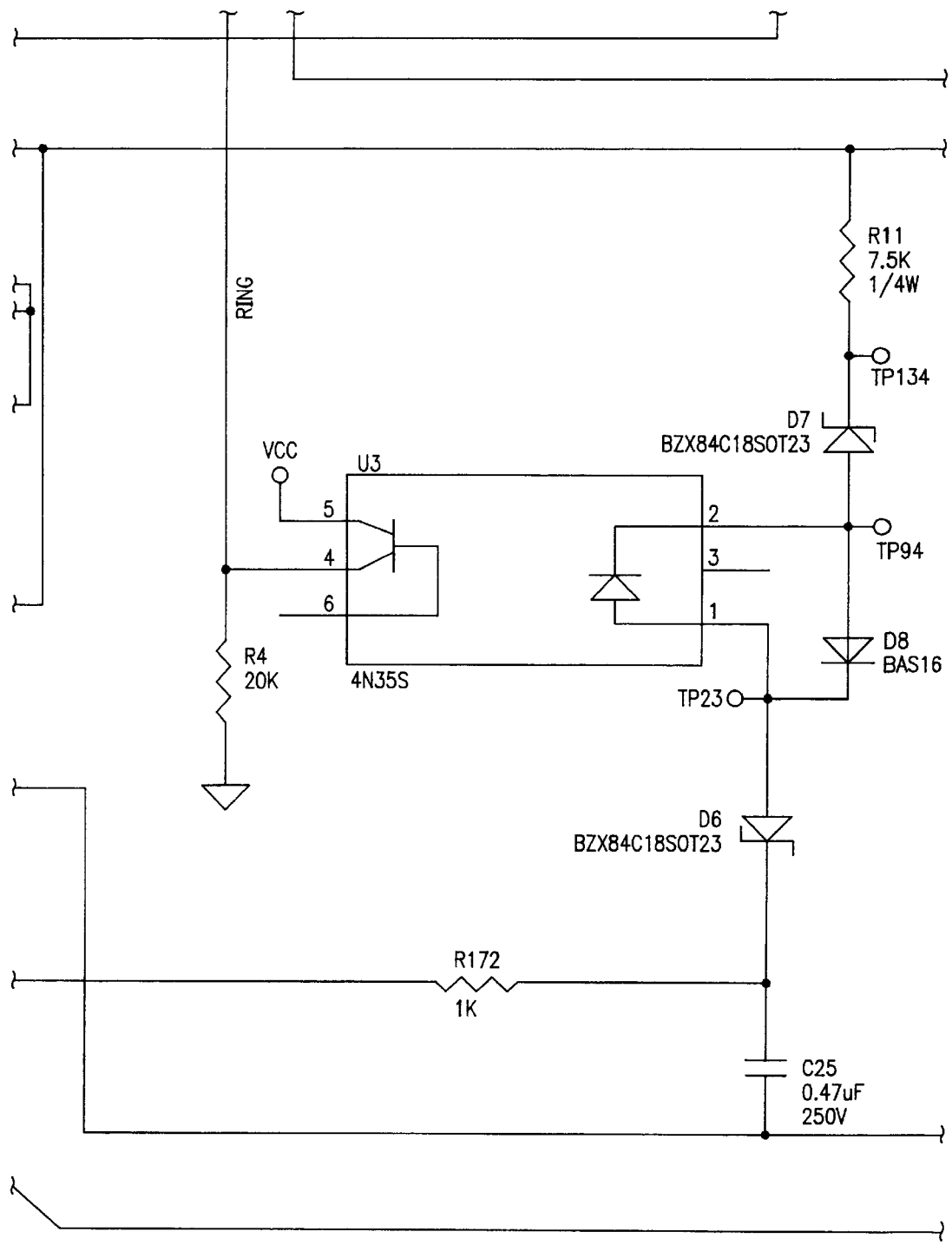
Figure 9C:
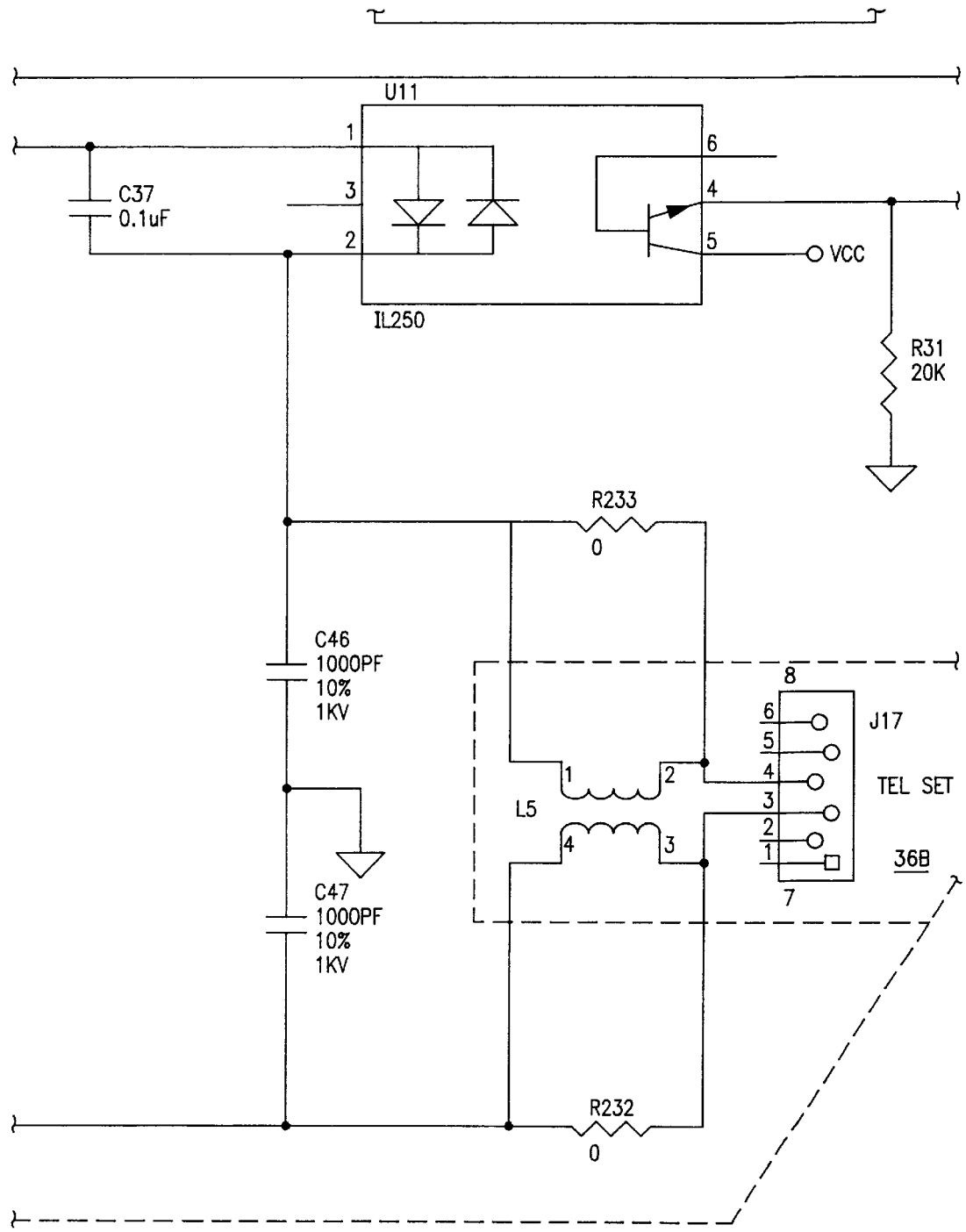
Figure 9C:
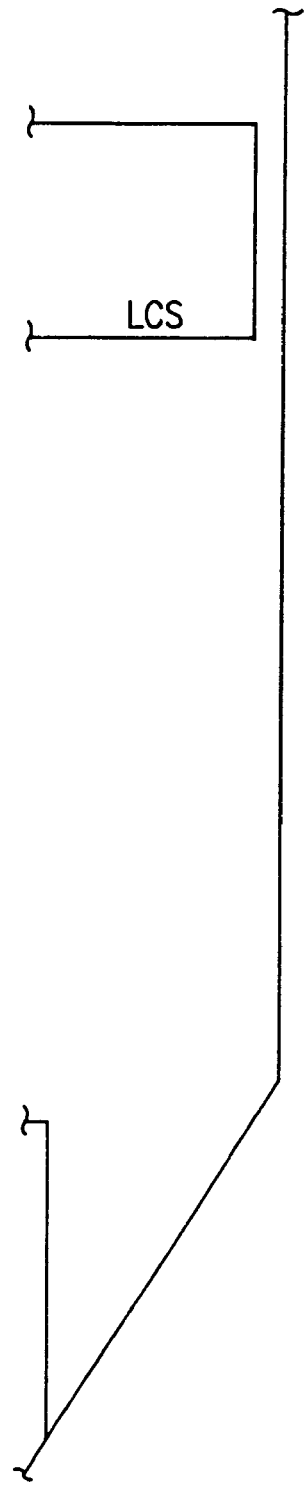

FIGS. 9A–9C how are circuit diagrams showing sections of the invention.

FIG. 9A shows option I and (alternatively) option II for interfacing the computer 16 (not shown) with the fax-modem 14. U220 is a chip 11594 interfacing the computer and the. the controller.

FIG. 9B shows chip U14 which holds controller 30, DSP 32, and AFE 34. U15 is a memory chip for storing programs for the controller 30. U16 is a memory chip for storing data.

Referring again to FIG. 9B, the headset 12 is shown within enclosure 12A and includes the speaker section 12B and the speaker driver section 12C. The audio receiver section 12D is shown.

RF signal generated in section 48 is mixed with the IF voice or data signal and transmitted to antenna 24 is through the duplex filter 46 which is chip UR1.

Details of the DAA circuit 36 are shown in FIG. 9C. The AFE34 on Chip U14 (shown in FIG. 9B) is connected at location A to DAA 36. Connections of DAA 36 to the telephone set are shown in enclosure 36B.

A low-cost modem has been described which provides wire and wireless capabilities to support existing wire modem technology as well as wireless capability to reduce wiring complexities. The combination phone-fax-modem of this invention has integrates a modem and an RF (radio frequency) section. The modem supports an existing V.34 up to 33.6 kbps and the RF portion can be CT-1, CT-2, or CT-2+ or a different frequency protocol.

The foregoing discussion describes a cost effective wireless solution to reducing the complexities posed by a requirement for simultaneous use of a a phone and computer. The appropriate version of this invention can be operated with a cordless phone handset modified according to the invention for connection to the modem and is compatible with existing software. The system can be used with a desktop PC (personal computer), notebook PC, network PC, or other terminal.

Variations and modifications of this invention may be suggested by reading the specification and studying the drawings which are within the scope of the invention. I therefore wish to define the scope of the invention by the appended claims.

What is claimed is:

1. A device for enabling a user to wirelessly transmit to and receive from a remote station a RF signal carried at a selected radio frequency said RF signal being messages generated by voice and including digital data, which comprises:

a phone (70) for generating audio frequency data representing voice messages initiated by said user and generating audio frequency data being voice messages transmitted to said user from said remote station;

a computer (16) arranged for generating and receiving digital data;

modem means (14) connected to said computer (16) including a modulating circuit (68) for converting the digital data from the computer to audio frequency data and a demodulater circuit (66) for converting audio frequency data to digital data for presentation to said computer, means for generating a RF signal (76);

means controlled by said user for setting frequency of said RF signal equal to said selected radio frequency;

mixer (74) for modulating said RF signal with audio frequency data; from said phone and said modem a manual double throw switch controllable by said user for connecting
said mixer (74) to one of:
(i) said phone when it is required to transmit to said remote station said audio frequency data generated by said phone;
(ii) said modem means when it is required to transmit said audio frequency data generated by said modem to said remote station;

transmitter means (62) connected to said mixer (74) for wirelessly transmitting said RF signal modulated by said audio frequency data to said remote station;

receiving means (60) adapted for receiving an RF signal modulated by audio frequency data received from said remote station;

means controlled by said user for adjusting said receiving means to receive said RF signal having said selected frequency;

means (78) connected to said receiving means for demodulating said RF signal to audio frequency data received from said remote station;

another double pole switch (64) accessible to said user having a common pole connected to said means (78) for demodulating;

one output pole of said another double pole switch connected to said phone (70);

another pole of said another double pole switch connected to said demodulator circuit (66) of said modem (14) whereby said switch is arranged for directing said received audio frequency data to a selected one of:
(i) said phone;
(ii) said modem means.

2. The device of claim 1 wherein said means for adjusting frequency of said RF signal equal to said selected RF frequency, said manual switching means for connecting said modulating means to one of said phone and said modem means, said means for adjusting said receiving means to receive said RF signal having said selected frequency, said manual switching means for directing said received audio frequency data to one of said phone and said modem means are mounted on a keyboard.

3. The device of claim 1 wherein said modem means is mounted on a printed circuit board pluggable into said computer.

4. The device of claim 1 wherein said modem means comprises:

digital signal processor means for converting digital data from said computer to quadrupole phase modulated data and companding said quadrupole phase modulated data to a companded waveform;

audio front end means for converting said companded waveform to said audio frequency data.

5. The device of claim 1 wherein said modem means comprises:

audio front end means for converting said audio frequency data to a companded waveform;

digital signal processor means for converting said companded waveform to quadrupole phase modulated data and converting said quadrupole phase modulated data to digital data for writing into said computer.

6. The device of claim 1 wherein said transmitter means adapted for wirelessly transmitting said RF signal modulated by said audio frequency data to a remote receiver base comprises:

a voltage controlled oscillator means for generating said said RF signal;

means controllable by said user for applying a selected d.c. voltage to said voltage controlled oscillator whereby a desired RF frequency is generated.

7. The device of claim 1 wherein means for demodulating said RF signal to received audio frequency data comprises means for selecting a frequency of said RF signal.

8. The device of claim 1 wherein said phone means, modem means, modulating means, means controllable by said user for connecting said modulating means to one of said phone and said modem means, transmitter means adapted for wirelessly transmitting said means controllable by said user for connecting said modulating means to one of said phone and said modem means, transmitter means adapted for wirelessly transmitting said RF signal modulated by said audio frequency data to a remote receiver base, means adapted for receiving an RF signal modulated by audio frequency data from a remote transmitter, means for demodulating said RF signal to received audio frequency data, means accessible to said user for directing said received audio frequency data are in one integrated enclosure.

9. The device of claim 1 wherein:

said phone means, modulating means, means controllable by said user for connecting said modulating means to one of said phone and said modem means, transmitter means adapted for wirelessly transmitting said means controllable by said user for connecting said modulating means to one of said phone and said modem means, transmitter means adapted for wirelessly transmitting said RF signal modulated by said audio frequency data to a remote receiver base, means adapted for receiving an RF signal modulated by audio frequency data from a remote transmitter, means for demodulating said RF signal to received audio frequency data, means accessible to said user for directing said received audio frequency data are in one integrated enclosure; and said modem means is in another enclosure and is connected to said one integrated enclosure by a cable.

10. The device of claim 1 wherein said phone means, modulating means, means controllable by said user for connecting said modulating means to one of said phone and said modem means, transmitter means adapted for wirelessly transmitting said means controllable by said user for connecting said modulating means to one of said phone and said modem means, transmitter means adapted for wirelessly transmitting said RF signal modulated by said audio frequency data to a remote receiver base, means adapted for receiving an RF signal modulated by audio frequency data from a remote transmitter, means for demodulating said RF signal to received audio frequency data, means accessible to said user for directing said received audio frequency data and said modem means are in one integrated enclosure.

11. The device of claim 1 wherein said phone means, modulating means, means controllable by said user for connecting said modulating means to one of said phone and said modem means, transmitter means adapted for wirelessly transmitting said means controllable by said user for connecting said modulating means to one of said phone and said modem means, transmitter means adapted for wirelessly transmitting said RF signal modulated by said audio frequency data to a remote receiver base, means adapted for receiving an RF signal modulated by audio frequency data from a remote transmitter, means for demodulating said RF signal to received audio frequency data, means accessible to said user for directing said received audio frequency data are in one integrated enclosure and said modem means is on a pc board adapted for plugging into said computer.

12. The device of claim 1 wherein said means for generating an RF signal and said means controlled by said user for setting frequency of said RF signal equal to said respective selected frequency comprises;

a voltage controlled oscillator; means controllable by said user for applying a selected d.c. voltage to said voltage controlled oscillator.

13. The device of claim 1 wherein said demodulating means and said means for adjusting said receiving means to receive said RF signal having said selected frequency comprises:

a mixer;

a receiver synthesizer controlled by said user to generate a dc signal applied to said mixer.

* * * * *